(12) United States Patent
Kariatsumari et al.

(10) Patent No.: US 8,874,315 B2
(45) Date of Patent: *Oct. 28, 2014

(54) MOTOR CONTROL UNIT AND VEHICLE STEERING SYSTEM

(75) Inventors: Yuji Kariatsumari, Yamatotakada (JP);
Yoshihiro Itatsu, Okazaki (JP);
Yoshinobu Shimizu, Sakai (JP)

(73) Assignee: JTEKT Corporation, Osaka-Shi (JP)

( * ) Notice: Subject to any disclaimer, the term of this patent is extended or adjusted under 35 U.S.C. 154(b) by 56 days.

This patent is subject to a terminal disclaimer.

(21) Appl. No.: 12/943,514

(22) Filed: Nov. 10, 2010

(65) Prior Publication Data
US 2011/0118937 A1 May 19, 2011

(30) Foreign Application Priority Data
Nov. 16, 2009 (JP) .................................. 2009-260780

(51) Int. Cl.
*B62D 5/04* (2006.01)
*B62D 5/14* (2006.01)
*H02P 29/00* (2006.01)

(52) U.S. Cl.
CPC .............. *B62D 5/046* (2013.01); *B62D 5/0496* (2013.01); *H02P 29/0055* (2013.01)
USPC ................. 701/41; 701/42; 180/443

(58) Field of Classification Search
CPC ....................................................... B62D 5/046
USPC ............... 701/41–42; 180/412–423, 443–447
See application file for complete search history.

(56) References Cited

U.S. PATENT DOCUMENTS

| | | |
|---|---|---|
| 5,513,720 A | 5/1996 | Yamamoto et al. |
| 5,568,389 A | 10/1996 | McLaughlin et al. |
| 5,928,298 A | 7/1999 | Matsuoka et al. |
| 6,364,051 B1 | 4/2002 | Kada et al. |
| 6,396,229 B1 | 5/2002 | Sakamoto et al. |

(Continued)

FOREIGN PATENT DOCUMENTS

| | | |
|---|---|---|
| EP | 1 487 098 A1 | 12/2004 |
| EP | 1 955 926 A2 | 8/2008 |
| EP | 2 086 106 A2 | 8/2009 |
| EP | 2 159 133 A1 | 3/2010 |
| EP | 2 177 422 A2 | 4/2010 |

(Continued)

OTHER PUBLICATIONS

Extended European Search Report issued in European Patent Application No. 10191142.8 dated Jun. 8, 2011.

(Continued)

*Primary Examiner* — Helal A Algahaim
*Assistant Examiner* — Charles J Han
(74) *Attorney, Agent, or Firm* — Oliff PLC

(57) ABSTRACT

When the estimated motor temperature becomes equal to or higher than the first predetermined temperature, an addition angle correction unit temporarily decreases the absolute value of the addition angle output from an addition angle limiter at time intervals. The addition angle correction unit makes the time interval shorter as the estimated motor temperature increases. When the time interval becomes equal to or shorter than the predetermined threshold, that is, when the estimated motor temperature becomes equal to or higher than the second predetermined temperature that is higher than the first predetermined temperature, the addition angle correction unit notifies a command current value changing unit of a current stop command. Thus, the γ-axis command current value is changed to 0, and therefore the steering mode is shifted to the manual steer mode.

14 Claims, 20 Drawing Sheets

(56) References Cited

U.S. PATENT DOCUMENTS

| | | | |
|---|---|---|---|
| 6,397,969 B1 | 6/2002 | Kasai et al. | |
| 6,781,333 B2 | 8/2004 | Koide et al. | |
| 7,076,340 B1 | 7/2006 | Inazumi et al. | |
| 2002/0026270 A1 | 2/2002 | Kurishige et al. | |
| 2002/0180402 A1* | 12/2002 | Koide et al. | 318/727 |
| 2003/0030404 A1 | 2/2003 | Iwaji et al. | |
| 2004/0267421 A1 | 12/2004 | Eskritt et al. | |
| 2005/0029972 A1 | 2/2005 | Imai et al. | |
| 2005/0257994 A1 | 11/2005 | Fujita | |
| 2005/0273236 A1 | 12/2005 | Mori et al. | |
| 2006/0086561 A1 | 4/2006 | Hidaka | |
| 2006/0090954 A1* | 5/2006 | Sugitani et al. | 180/446 |
| 2006/0125439 A1 | 6/2006 | Ajima et al. | |
| 2007/0040528 A1 | 2/2007 | Tomigashi et al. | |
| 2007/0229021 A1 | 10/2007 | Yoshida et al. | |
| 2007/0273317 A1 | 11/2007 | Endo et al. | |
| 2007/0284181 A1 | 12/2007 | Muranaka | |
| 2008/0035411 A1 | 2/2008 | Yamashita et al. | |
| 2008/0047775 A1 | 2/2008 | Yamazaki | |
| 2008/0128197 A1 | 6/2008 | Kawaguchi et al. | |
| 2008/0201041 A1 | 8/2008 | Jiang | |
| 2009/0069979 A1 | 3/2009 | Yamashita et al. | |
| 2009/0240389 A1 | 9/2009 | Nomura et al. | |
| 2010/0057300 A1 | 3/2010 | Nishiyama | |
| 2010/0094505 A1 | 4/2010 | Kariatsumari et al. | |
| 2010/0198462 A1 | 8/2010 | Shinoda et al. | |
| 2010/0263709 A1* | 10/2010 | Norman et al. | 136/246 |
| 2011/0035114 A1 | 2/2011 | Yoneda et al. | |
| 2012/0080259 A1 | 4/2012 | Ueda et al. | |

FOREIGN PATENT DOCUMENTS

| | | |
|---|---|---|
| EP | 2 216 895 A2 | 8/2010 |
| JP | A 4-161085 | 6/1992 |
| JP | A 6-305436 | 11/1994 |
| JP | A 9-226606 | 9/1997 |
| JP | A 10-76960 | 3/1998 |
| JP | A-10-243699 | 9/1998 |
| JP | A 2000-050689 | 2/2000 |
| JP | A 2001-37281 | 2/2001 |
| JP | A 2001-251889 | 9/2001 |
| JP | A 2002-359996 | 12/2002 |
| JP | A 2003-125594 | 4/2003 |
| JP | A 2003-182620 | 7/2003 |
| JP | A 2007-53829 | 3/2007 |
| JP | A 2007-267549 | 10/2007 |
| JP | A 2008-24196 | 2/2008 |
| JP | A 2008-087756 | 4/2008 |
| JP | A-2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

U.S. Appl. No. 12/823,573, filed Jun. 25, 2010.
U.S. Appl. No. 13/685,152, filed Nov. 26, 2012.
U.S. Appl. No. 12/696,604, filed Jan. 29, 2010.
U.S. Appl. No. 12/945,101, filed Nov. 12, 2010.
U.S. Appl. No. 12/946,187, filed Nov. 15, 2010.
U.S. Appl. No. 13/205,138, filed Aug. 8, 2011.
U.S. Appl. No. 12/997,168, filed Dec. 9, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Nov. 7, 2013 Office Action issued in U.S. Appl. No. 13/685,152.
Jul. 17, 2013 Office Action issued in U.S. Appl. No. 13/685,152.
Jul. 20, 2010 Search Report issued in European Patent Application No. 10156226.
May 24, 2012 Office Action issued in U.S. Appl. No. 12/721,855.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep.. 10, 2012 Office Action issued in U.S. Appl. No. 13/205,138.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
May 22, 2014 Office Action issued in Japanese Patent Application No. 2010-186220 (with translation).

* cited by examiner

MOTOR CONTROL UNIT AND VEHICLE STEERING SYSTEM

INCORPORATION BY REFERENCE

The disclosure of Japanese Patent Application No. 2009-260780 filed on Nov. 16, 2009 including the specification, drawings and abstract is incorporated herein by reference in its entirety.

BACKGROUND OF THE INVENTION

1. Field of the Invention

The invention relates to a motor control unit used to drive a brushless motor, and a vehicle steering system, for example, an electric power steering system, which includes the motor control unit.

2. Description of the Related Art

A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

To address this problem, a sensorless drive method for driving a brushless motor without using a rotational angle sensor has been proposed. According to the sensorless drive method, the induced voltage that is caused due to the rotation of a rotor is estimated in order to estimate the phase of a magnetic pole (electrical angle of the rotor). When the rotor is at a standstill or rotating at a considerably low speed, it is not possible to estimate the phase of the magnetic pole. Therefore, the phase of the magnetic pole is estimated by another method. More specifically, a sensing signal is input in a stator, and a response of the motor to the sensing signal is detected. Then, the rotational position of the rotor is estimated based on the response of the motor.

For example, Japanese Patent Application Publication No. 10-243699 (JP-A-10-243699) and Japanese Patent Application Publication No. 2009-124811 (JP-A-2009-124811) describe the related art.

According to the sensorless drive method described above, the rotational position of the rotor is estimated based on the induced voltage or the sensing signal, and the motor is controlled based on the estimated rotational position. However, this drive method is not suitable for all uses. There has not been established a method suitable for a control of a brushless motor that is used as a drive source for, for example, a vehicle steering system such as an electric power steering system that supplies a steering assist force to a vehicle steering mechanism. Accordingly, a sensorless control executed by another method has been demanded.

SUMMARY OF INVENTION

The invention provides a motor control unit that controls a motor according to a new control method that does not require a rotational angle sensor, and a vehicle steering system that includes the motor control unit.

A first aspect of the invention relates to a motor control unit that controls a motor that includes a rotor and a stator that faces the rotor. The motor control unit includes a current drive unit, an addition angle calculation unit, a control angle calculation unit, a temperature detection/estimation unit, and a control angle correction unit. The current drive unit drives the motor based on an axis current value of a rotating coordinate system that rotates in accordance with a control angle that is a rotational angle used in a control. The addition angle calculation unit calculates an addition angle that is to be added to the control angle. The control angle calculation unit obtains a present value of the control angle by adding the addition angle calculated by the addition angle calculation unit to an immediately preceding value of the control angle in predetermined calculation cycles. The temperature detection/estimation unit detects or estimates a temperature of a heat generation element. The control angle correction unit corrects the control angle based on the temperature detected or estimated by the temperature detection/estimation unit.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
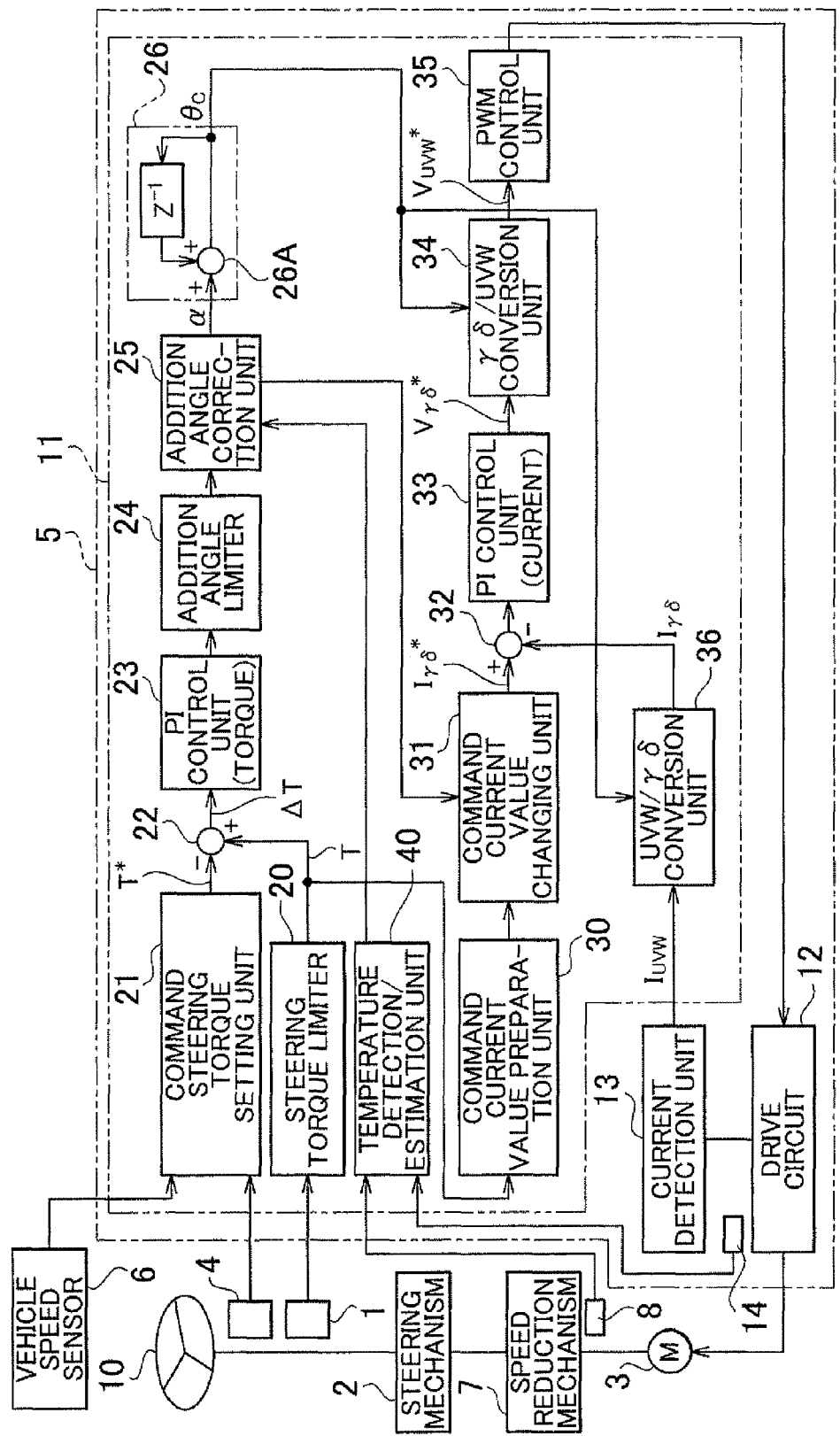
FIG. 1 is a block diagram for describing the electrical configuration of an electric power steering system to which a motor control unit according to a first embodiment of the invention is applied.

Hereafter, example embodiments of the invention will be described in detail with reference to the accompanying drawings. FIG. 1 is a block diagram for describing the electrical configuration of an electric power steering system (an example of a vehicle steering system) to which a motor control unit according to a first embodiment of the invention is applied. The electric power steering system includes a torque sensor 1, a motor 3 (brushless motor), a steering angle sensor 4, a motor control unit 5, and a vehicle speed sensor 6. The torque sensor 1 detects the steering torque T that is applied to a steering wheel 10 that serves as an operation member used to steer a vehicle. The motor 3 (brushless motor) applies a steering assist force to a steering mechanism 2 of the vehicle via a speed reduction mechanism 7. The steering angle sensor 4 detects the steering angle that is the rotational angle of the steering wheel 10. The motor control unit 5 controls driving of the motor 3. The vehicle speed sensor 6 detects the speed of the vehicle in which the electric power steering system is mounted. The steering angle sensor 4 detects the amount of rotation (rotational angle) of the steering wheel 10 from the neutral position (reference position) of the steering wheel 10 in the clockwise direction, and the amount of rotation of the steering wheel 10 from the neutral position in the counterclockwise direction. The steering angle sensor 4 outputs, as a positive value, the amount of rotation of the steering wheel 10 from the neutral position in the clockwise direction. The steering angle sensor outputs, as a negative value, the amount of rotation of the steering wheel 10 from the neutral position in the counterclockwise direction.

Figure 2:
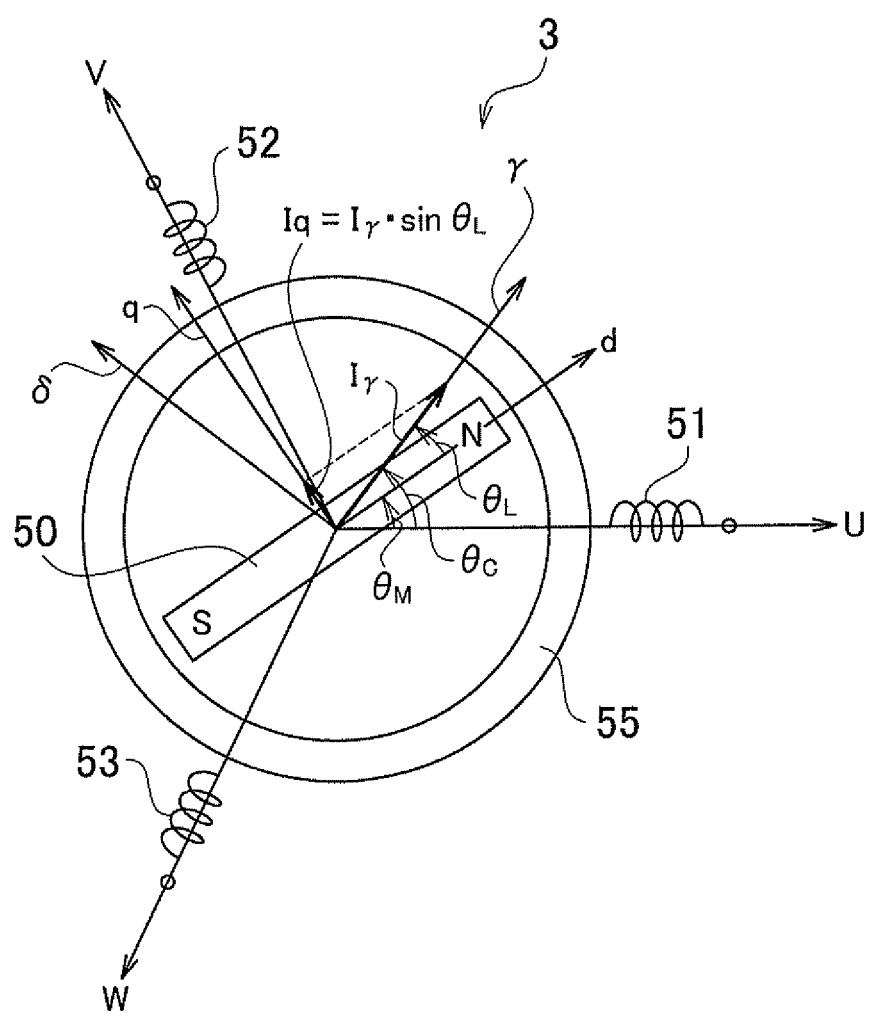
FIG. 2 is a view for describing the configuration of a motor.

The motor control unit 5 drives the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed. In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) $\theta_M$ of the rotor 50 is a rotational angle of the d-axis with respect to the U-axis. The dq coordinate system is an actual rotating coordinate system that rotates in accordance with the rotor angle $\theta_M$. With the use of the rotor angle $\theta_M$, coordinate conversion may be made between the UVW coordinate system and the dq coordinate system.

In the first embodiment, the control angle $\theta_C$ that indicates the rotational angle used in the control is employed. The control angle $\theta_C$ is an imaginary rotational angle with respect to the U-axis. An imaginary two-phase rotating coordinate system (γδ coordinate system: hereafter, referred to as "imaginary rotating coordinate system"), where the imaginary axis that forms the control angle $\theta_C$ with the U-axis is used as the γ-axis, and the axis that is advanced 90 degrees from the γ-axis is used as the δ-axis, is defined. When the control angle $\theta_C$ is equal to the rotor angle $\theta_M$, the γδ coordinate system, which is the imaginary rotating coordinate system, and the dq coordinate system, which is the actual rotating coordinate system, coincide with each other. That is, the γ-axis, which is the imaginary axis, coincides with the d-axis, which is the actual axis, and the δ-axis, which is the imaginary axis, coincides with the q-axis, which is the actual axis. The γδ coordinate system is an imaginary rotating coordinate system that rotates in accordance with the control angle $\theta_C$. Coordinate conversion may be made between the UVW coordinate system and the γδ coordinate system with the use of the control angle $\theta_C$.

The load angle $\theta_L$ ($=\theta_C - \theta_M$) is defined based on the difference between the control angle $\theta_C$ and the rotor angle $\theta_M$. When the γ-axis current $I_\gamma$ is supplied to the motor 3 based on the control angle $\theta_C$, the q-axis component of the γ-axis current $I_\gamma$ (orthogonal projection to the q-axis) is used as the q-axis current $I_q$ that contributes to generation of torque by the rotor 50. That is, the relationship expressed by Equation 1 is established between the γ-axis current $I_\gamma$ and the q-axis current $I_q$.

$$I_q = I_\gamma \times \sin \theta_L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current $I_U$, the V-phase current $I_V$ and the W-phase current $I_W$ that flow through the U-phase stator coil 51, the V-phase stator coil 52, and the W-phase stator coil 53 of the motor 3, respectively, (these phase currents will be collectively referred to as "three-phase detected current $I_{UVW}$" where appropriate). The U-phase current $I_U$, the V-phase current $I_V$ and the W-phase current $I_W$ are the current values in the directions of the axes of the UVW coordinate system. The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a PI (proportional-integral) control unit 23, an addition angle limiter 24, an addition angle correction unit 25, a control angle calculation unit 26, a command current value preparation unit 30, a command current value changing unit 31, current deviation calculation unit 32, a PI control unit 33, a γδ/UVW conversion unit 34, a PWM (Pulse Width Modulation) control unit 35, a UVW/γδ conversion unit 36, and a temperature detection/estimation unit 40. The addition angle correction unit 25 may be used as a control angle correction unit according to the invention.

Figure 4:
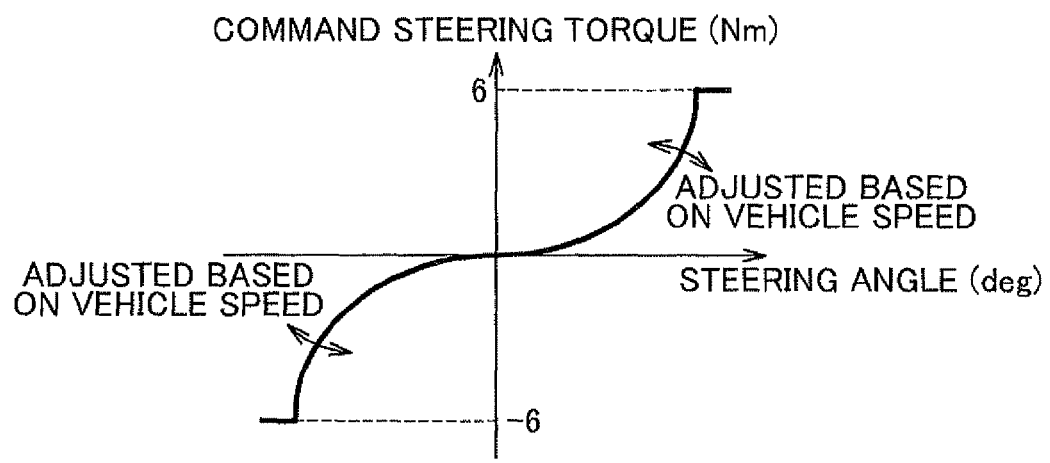
FIG. 4 is a graph showing an example of the characteristic of the command steering torque with respect to the steering angle.

The command steering torque setting unit 21 sets the command steering torque T* based on the steering angle detected by the steering angle sensor 4 and the vehicle speed detected by the vehicle speed sensor 6. For example, as shown in FIG. 4, the command steering torque T* when the steering angle is a positive value (when the steering wheel 10 is operated clockwise) is set to a positive value (torque applied in the clockwise direction), whereas the command steering torque T* when the steering angle is a negative value (when the steering wheel 10 is operated counterclockwise) is set to a negative value (torque applied in the counterclockwise direction). The command steering torque T* is set in such a manner that the absolute value of the command steering torque T* increases (non-linearly increases, in the example in FIG. 4) as the absolute value of the steering angle increases. However, the command steering torque T* is set to a value within a range between a predetermined upper limit (positive value (e.g. +6 Nm)) and a predetermined lower limit (negative value (e.g. −6 Nm)). In addition, the command steering torque T* is set in such a manner that the absolute value of the command steering torque T* decreases as the vehicle speed increases. That is, a vehicle speed-sensitive control is executed.

Figure 5:
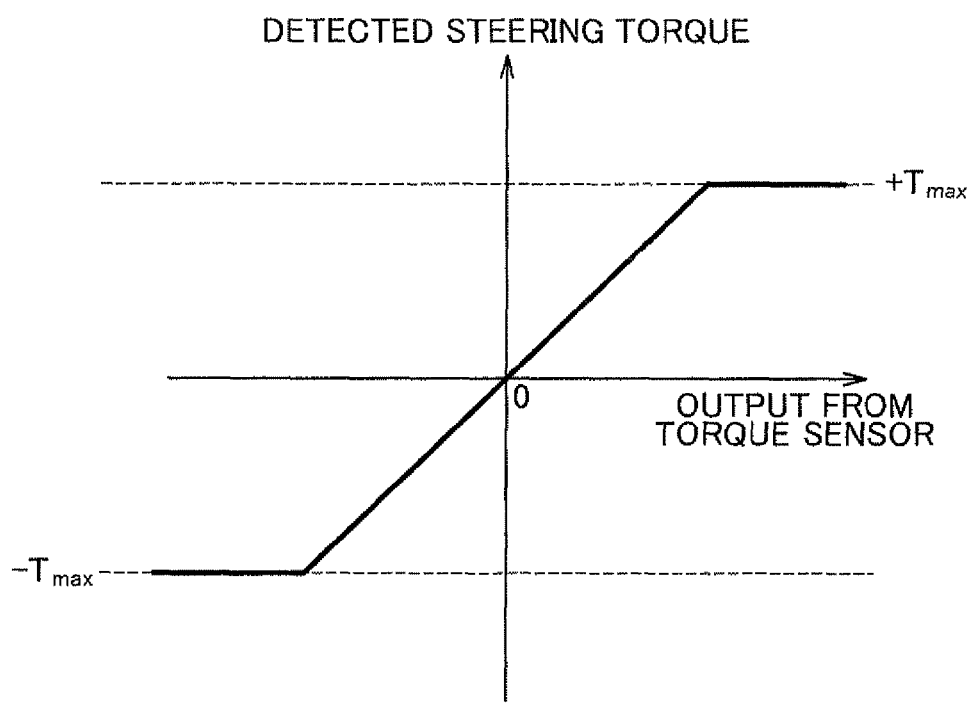
FIG. 5 is a graph for describing the function of a steering torque limiter.

The steering torque limiter 20 limits the output from the torque sensor 1 within a range between a predetermined upper saturation value $+T_{max}$ ($+T_{max}>0$ (e.g. $+T_{max}=7$ Nm)) and a predetermined lower saturation value $-T_{max}$ ($-T_{max}<0$ (e.g. $-T_{max}=-7$ Nm)). More specifically, as shown in FIG. 5, when the output from the torque sensor 1 is within the range between the upper saturation value $+T_{max}$ and the lower saturation value $-T_{max}$, the steering torque limiter 20 outputs the detected steering torque that is the value output from the torque sensor 1 without limitation. When the detected steering torque from the torque sensor 1 is equal to or higher than the upper saturation value $+T_{max}$, the steering torque limiter 20 outputs the upper saturation value $+T_{max}$. When the detected steering torque from the torque sensor 1 is equal to or lower than the lower saturation value $-T_{max}$, the steering torque limiter 20 outputs the lower saturation value $-T_{max}$. The saturation values $+T_{max}$ and $-T_{max}$ define a stable range (reliable range) of the output signal from the torque sensor 1. That is, in the range where the output from the torque sensor 1 is higher than the upper saturation value $+T_{max}$ and the range where the output from the torque sensor 1 is lower than the lower saturation value $-T_{max}$, the output signal from the torque sensor 1 is unstable and does not correspond to the actual steering torque. In other words, the saturation values $+T_{max}$ and $-T_{max}$ are determined based on the output characteristic of the torque sensor 1.

The torque deviation calculation unit 22 calculates the deviation (torque deviation) ΔT (T−T*) of the steering torque T that is detected by the torque sensor 1 and then subjected to the limitation process by the steering torque limiter 20 (hereinafter, will be referred to as "detected steering torque T") from the command steering torque T* set by the command steering torque setting unit 21. The PI control unit 23 executes the PI calculation on the torque deviation ΔT. That is, the torque deviation calculation unit 22 and the PI control unit 23 constitute a torque feedback control unit that brings the detected steering torque T to the command steering torque T*. The PI control unit 23 calculates the addition angle α for the control angle $θ_C$ by executing the PI calculation on the torque deviation ΔT. Therefore, the torque feedback control unit constitutes an addition angle calculation unit that calculates the addition angle α that should be added to the control angle $θ_C$.

The addition angle limiter 24 imposes limitations on the addition angle α obtained by the PI control unit 23. More specifically, the addition angle limiter 24 limits the addition angle α to a value within a range between a predetermined upper limit UL (positive value) and a predetermined lower limit LL (negative value). The upper limit UL and the lower limit LL are determined based on a predetermined limit $ω_{max}$ ($ω_{max}>0$: e.g. preset value of $ω_{max}=45$ degrees). The preset value of the predetermined limit $ω_{max}$ is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

Maximum rotor angular speed=maximum steering angular speed×speed reduction ratio×number of pole pairs    Equation 2

The maximum value of the amount of change in the electrical angle of the rotor 50 between the calculations (in the calculation cycle) of the control angle $θ_C$ is expressed by the value obtained by multiplying the maximum rotor angular speed by the calculation cycle, as indicated by Equation 3.

Maximum value of amount of change in rotor angle=maximum rotor angular speed×calculation cycle=maximum steering angular speed×speed reduction ratio×number of pole pairs×calculation cycle    Equation 3

This maximum value of the amount of change in the rotor angle is the maximum amount of change in the control angle $θ_C$ that is permitted within one calculation cycle. Therefore, the maximum value of the amount of change in the rotor angle may be used as the preset value of the limit $ω_{max}$. With the use of the limit $ω_{max}$, the upper limit UL and the lower limit LL for the addition angle α are expressed by Equation 4 and Equation 5, respectively.

$UL=+ω_{max}$    Equation 4

$LL=-ω_{max}$    Equation 5

The temperature detection/estimation unit 40 detects or estimates the temperature of the motor 3 or the motor control unit 5. The temperature of the motor control unit 5 signifies mainly the temperature of the drive circuit 12. The temperature detection/estimation unit 40 may detect the temperature of the motor 3. In this case, the temperature detection/estimation unit 40 detects the temperature of the motor 3 based on a signal output from a temperature sensor 8 that detects the temperature of the motor 3. Also, the temperature detection/estimation unit 40 may detect the temperature of the drive circuit 12. In this case, the temperature detection/estimation unit 40 detects the temperature of the drive circuit 12 based on a signal output from a temperature sensor 14 that detects the temperature of the temperature of the drive circuit 12.

The temperature detection/estimation unit 40 may estimate the temperature of the motor 3 or the drive circuit 12. In this case, the above-mentioned temperature sensors 8 and 14 are not required. The temperature detection/estimation unit 40 estimates the temperature of the motor 3 or the drive circuit 12 with the use of, for example, the electric current supplied to the motor 3, the frequency of the electric current, the outside air temperature, and a constant that is set in advance based on the characteristics of the motor 3. The temperature detection/estimation unit 40 may estimate the temperature of the motor 3 or the drive circuit 12 based on the accumulated value of the detected current $I_{UVW}$ detected by the current detection unit 13 or the accumulated value of the two-phase detected current obtained by the UVW/γδ conversion unit 36. The temperature of the motor 3 or the drive circuit 12, which is detected or estimated by the temperature detection/estimation unit 40, is provided to the addition angle correction unit 25. For convenience of explanation, hereafter, the temperature detection/estimation unit 40 estimates the temperature of the motor 3 and provides the estimated motor temperature to the addition angle correction unit 25.

The addition angle correction unit 25 has an overheat protection function of shifting the steering mode to the manual steer mode by providing a current stop command to the command current value changing unit 31, described later in detail, when the estimated motor temperature becomes high, and a sign notification function of notifying a driver of a sign of shift to the manual steer mode. More specifically, the addition angle correction unit 25 corrects the addition angle α obtained through the limitation process by the addition angle limiter 24 based on the estimated motor temperature estimated by the temperature detection/estimation unit 40, and controls the command current value changing unit 31 based on the estimated motor temperature. The details of the process (addition angle correction process) executed by the addition angle correction unit 25 will be described later.

The addition angle α obtained through the correction process executed by the addition angle correction unit 25 is added to the immediately preceding value $\theta_C(n-1)$ (n is the number of the present calculation cycle) of the control angle $\theta_C$ by an addition unit 26A of the control angle calculation unit 26 ("$Z^{-1}$" in the drawings indicates the immediately preceding value indicated by a signal). Note that, the initial value of the control angle $\theta_C$ is a predetermined value (e.g. 0). The control angle calculation unit 26 includes the addition unit 26A that adds the addition angle α provided from the addition angle changing unit 25 to the immediately preceding value $\theta_C(n-1)$ of the control angle $\theta_C$. That is, the control angle calculation unit 26 calculates the control angle $\theta_C$ in predetermined calculation cycles. The control angle calculation unit 26 uses the control angle $\theta_C$ in the immediately preceding calculation cycle as the immediately preceding value $\theta_C(n-1)$, and obtains the present value $\theta_C(n)$ that is the control angle $\theta_C$ in the present calculation cycle based on the immediately preceding value $\theta_C(n-1)$.

The command current value preparation unit 30 prepares, as command current values, values of electric currents that should be supplied to the coordinate axes (imaginary axes) of the γδ coordinate system, which is the imaginary rotating coordinate system that corresponds to the control angle $\theta_C$ that is a rotational angle used in the control. More specifically, the command current value preparation unit 30 prepares the γ-axis command current value $I_\gamma^*$ and the δ-axis command current value $I_\delta^*$ (hereinafter, these values will be collectively referred to as "two-phase command current value $I_{\gamma\delta}^*$" where appropriate). The command current value preparation unit 30 sets the γ-axis command current value $I_\gamma^*$ to a significant value, and sets the δ-axis command current value $I_\delta^*$ to 0. More specifically, the command current value preparation unit 30 sets the γ-axis command current value $I_\gamma^*$ based on the detected steering torque T that is detected by the torque sensor 1.

Figure 6:
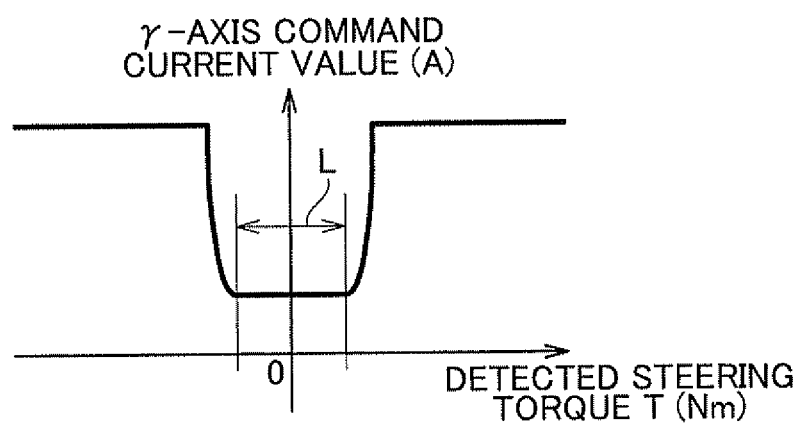
FIG. 6 is a graph showing an example of a manner of setting the γ-axis command current value.

FIG. 6 shows an example of a manner of setting the γ-axis command current value $I_\gamma^*$ with respect to the detected steering torque T. The γ-axis command current value $I_\gamma^*$ is set to a low value within a range L where the detected steering torque T is near 0. The γ-axis command current value $I_\gamma^*$ rises sharply in the region outside the range L where the detected steering torque T is near 0, and is maintained substantially constant in the region where the torque is at or higher than a predetermined value. Thus, when the driver does not operate the steering wheel 10, the γ-axis command current value $I_\gamma^*$ is reduced to suppress unnecessary electric power consumption.

The command current value changing unit 31 changes the γ-axis command current value $I_\gamma^*$ prepared by the command current value preparation unit 30 according to a command from the addition angle correction unit 25. More specifically, the addition angle correction unit 25 notifies the command current value changing unit 31 of a current stop command using the overheat protection function, when the estimated motor temperature becomes equal to or higher than a predetermined temperature. Upon reception of the current stop command, the command current value changing unit 31 changes the γ-axis command current value $I_\gamma^*$ prepared by the command current value preparation unit 30 to 0. Accordingly, when the estimated motor temperature becomes equal to or higher than the predetermined temperature, the γ-axis command current value $I_\gamma^*$ becomes 0. Therefore, the steering mode is shifted to the manual steer mode in which a steering assist force is not generated.

The current deviation calculation unit 32 calculates the deviation $I_\gamma^* - I_\gamma$ of the γ-axis detected current $I_\gamma$ from the γ-axis command current value $I_\gamma^*$ prepared by the command current value preparation unit 30 and then subjected to the changing process by the command current value changing unit 31, and the deviation $I_\delta^* - I_\delta$ of the δ-axis detected current $I_\delta$ from the δ-axis command current value $I_\delta^* (=0)$. The γ-axis detected current $I_\gamma$ and the δ-axis detected current $I_\delta$ are provided from the UVW/γδ conversion unit 36 to the deviation calculation unit 32.

The UVW/γδ conversion unit 36 converts the three-phase detected current $I_{UVW}$ (U-phase detected current $I_U$, V-phase detected current $I_V$, and the W-phase detected current $I_W$) of the UVW coordinate system, which is detected by the current detection unit 13, into the two-phase detected currents $I_\gamma$ and $I_\delta$ of the γδ coordinate system (hereinafter, these phase currents will be collectively referred to as "two-phase detected current $I_{\gamma\delta}$" where appropriate). These two-phase detected currents $I_\gamma$ and $I_\delta$ are provided to the current deviation calculation unit 32. The control angle $\theta_C$ calculated by the control angle calculation unit 26 is used for the coordinate conversion that is executed by the UVW/γδ conversion unit 36.

The PI control unit 33 executes the PI calculation on the current deviation calculated by the current deviation calculation unit 32 to prepare the two-phase command voltage $V_{\gamma\delta}^*$ (the γ-axis command voltage $V_\gamma^*$ and the δ-axis command voltage $V_\delta^*$) that should be applied to the motor 3. The two-phase command voltage $V_{\gamma\delta}^*$ is provided to the γδ/UVW conversion unit 34. The γδ/UVW conversion unit 34 executes the coordinate conversion calculation on the two-phase command voltage $V_{\gamma\delta}^*$ to prepare the three-phase command voltage $V_{UVW}^*$. The control angle $\theta_C$ calculated by the control angle calculation unit 26 is used for this coordinate conversion. The three-phase command voltage $V_{UVW}^*$ is formed of the U-phase command voltage $V_U^*$, the V-phase command voltage $V_V^*$ and the W-phase command voltage $V_W^*$. The three-phase command voltage $V_{UVW}^*$ is provided to the PWM control unit 35.

The PWM control unit 35 prepares the U-phase PWM control signal, the V-phase PWM control signal and the W-phase PWM control signal having duty ratios that correspond to the U-phase command voltage $V_U^*$, the V-phase command voltage $V_V^*$ and the W-phase command voltage $V_W^*$, respectively, and provides the control signals to the drive circuit 12. The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage $V_{UVW}^*$ are applied to the U-phase stator coil 51, the V-phase stator coil 52 and the W-phase stator coil 53 of the motor 3.

Figure 3:
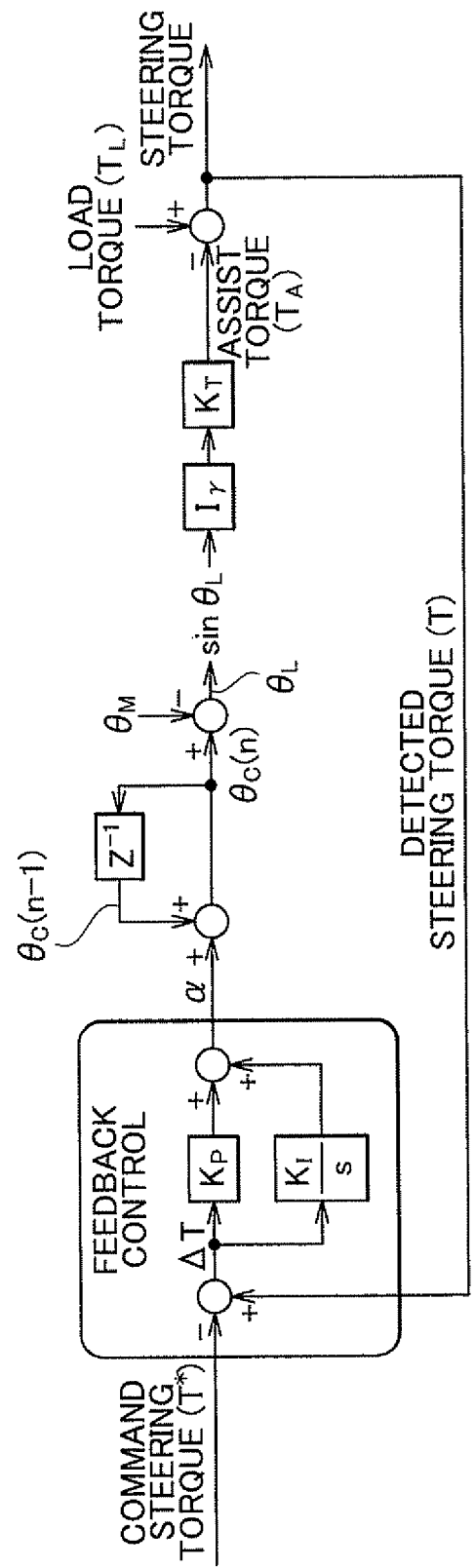
FIG. 3 is a control block diagram for the electric power steering system.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value $I_{\gamma\delta}^*$ that is set by the command current value preparation unit 30. FIG. 3 is a control block diagram of the electric power steering system. Note that the functions of the addition angle limiter 24 and the addition angle correction unit 25 are omitted to simplify the explanation.

Through the PI control ($K_P$ is a proportionality coefficient, $K_I$ is an integration coefficient, and 1/s is an integration operator) on the deviation (torque deviation) ΔT of the detected steering torque T from the command steering torque T*, the addition angle α is prepared. The present value $\theta_C(n)$ ($\theta_C(n)=\theta_C(n-1)+\alpha$) of the control angle $\theta_C$ is obtained by adding the addition angle α to the immediately preceding value $\theta_C(n-1)$ of the control angle $\theta_C$. At this time, the deviation of the actual rotor angle $\theta_M$ of the rotor 50 from the control angle $\theta_C$ is used as the load angle $\theta_L$ ($\theta_L=\theta_C-\theta_M$).

Therefore, if the γ-axis current $I_\gamma$ is supplied to the γ-axis (imaginary axis) in the γδ coordinate system (imaginary rotating coordinate system), which rotates in accordance with the control angle $\theta_C$, based on the γ-axis command current value the q-axis current $I_q$ is equal to $I_\gamma \sin\theta_L$ ($I_q = I_\gamma \sin\theta_L$). The q-axis current $I_q$ contributes to generation of torque by the rotor 50. That is, the value obtained by multiplying the q-axis current $I_q$ (=$I_\gamma \sin\theta_L$) by the torque constant $K_T$ of the motor 3 is transmitted to the steering mechanism 2 via the speed reduction mechanism 7 as the assist torque $T_A$ (=$K_T \times I_\gamma \sin\theta_L$). The value obtained by subtracting the assist torque $T_A$ from the load torque $T_L$ from the steering mechanism 2 is the steering torque that should be applied by the driver to the steering wheel 10. When the steering torque is fed back through the steering torque limiter 20, a system is operated in such a manner that the steering torque is brought to the command steering torque T*. That is, the addition angle α is obtained and the control angle $\theta_C$ is controlled based on the addition angle α so that the detected steering torque T coincides with the command steering torque T*.

The control angle $\theta_C$ is updated with the use of the addition angle α that is obtained based on the deviation ΔT of the detected steering torque T from the command steering torque T* while an electric current is supplied to the γ-axis that is the imaginary axis used in the control. Thus, the load angle $\theta_L$ changes and therefore, the torque that corresponds to the load angle $\theta_L$ is generated by the motor 3. Therefore, the torque that corresponds to the command steering torque T* set based on the steering angle and the vehicle speed is generated by the motor 3. Accordingly, an appropriate steering assist force that corresponds to the steering angle and the vehicle speed is applied to the steering mechanism 2. That is, a steering assist control is executed in such a manner that the steering torque increases as the absolute value of the steering angle increases and the steering torque decreases as the vehicle speed increases.

Therefore, there is provided the electric power steering system in which an appropriate steering assist operation is executed by appropriately controlling the motor 3 without using a rotational angle sensor. Thus, the configuration is simplified and cost is reduced. In the first embodiment, the addition angle α is controlled in such a manner that the load angle $\theta_L$ is adjusted in a region where there is a positive correlation between the load angle $\theta_L$ and the motor torque (assist torque). More specifically, because the q-axis current $I_q$ is equal to $I_\gamma \sin\theta_L$ ($I_q = I_\gamma \sin\theta_L$), the addition angle α is controlled in such a manner that the load angle $\theta_L$ is equal to or larger than −90° and equal to or smaller than 90° (−90°≤$\theta_L$≤90°). The addition angle α may be controlled in such a manner that the load angle $\theta_L$ is adjusted in a region where there is a negative correlation between the load angle $\theta_L$ and the motor torque (assist torque). In this case, the addition angle α is controlled in such a manner that the load angle $\theta_L$ is equal to or larger than 90° and equal to or smaller than 270° (90°≤$\theta_L$≤270°). If a gain of the PI control unit 23 is set to a positive value, the control is executed in the region where there is a positive correlation between the load angle $\theta_L$ and the motor torque. On the other hand, if a gain of the PI control unit 23 is set to a negative value, the control is executed in the region where there is a negative correlation between the load angle $\theta_L$ and the motor torque.

Figure 7:
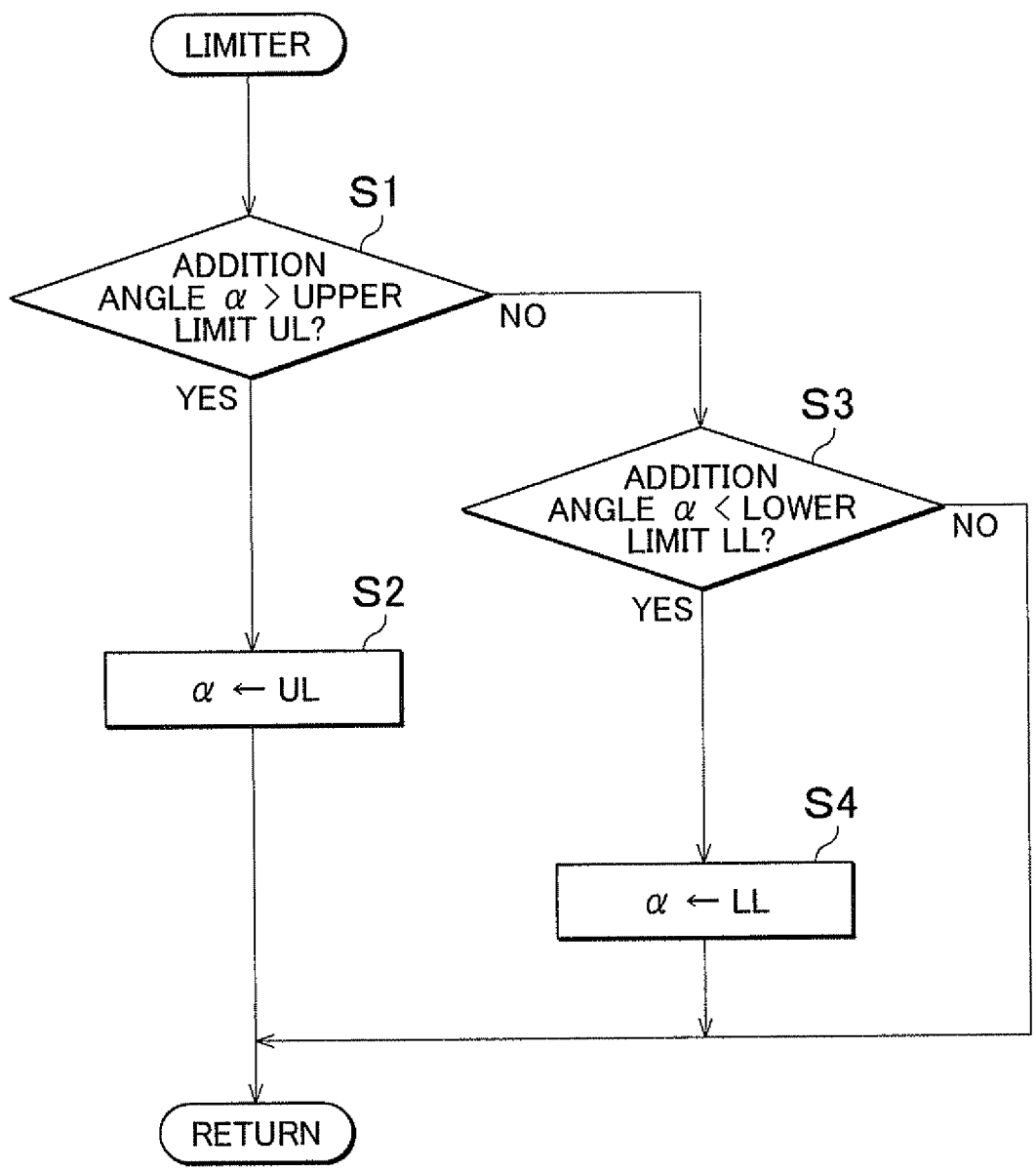
FIG. 7 is a flowchart for describing the function of an addition angle limiter.

FIG. 7 is a flowchart for describing the function of the addition angle limiter 24. The addition angle limiter 24 compares the addition angle α obtained by the PI control unit 23 with the upper limit UL (step (hereinafter, referred to as "S") 1). When the addition angle α is larger than the upper limit UL ("YES" in S1), the upper limit UL is substituted for the addition angle α (S2). Thus, the upper limit UL (=+$\omega_{max}$) is provided to the addition angle correction unit 25.

When the addition angle α obtained by the PI control unit 23 is equal to or smaller than the upper limit UL ("NO" in S1), the addition angle limiter 24 further compares the addition angle α with the lower limit LL (S3). When the addition angle α is smaller than the lower limit LL ("YES" in S3), the lower limit LL is substituted for the addition angle α (S4). Thus, the lower limit LL (=−$\omega_{max}$) is provided to the addition angle correction unit 25.

When the addition angle α obtained by the PI control unit 23 is equal to or larger than the lower limit LL and equal to or smaller than the upper limit UL ("NO" in S3), the addition angle α is provided to the addition angle correction unit 25 without limitation. Therefore, the addition angle limiter 24 limits the addition angle α to a value within the range between the upper limit UL and the lower limit LL so as to stabilize the control. More specifically, although the control state is unstable (assist force is unstable) when the electric current is low or when the control starts, the control is encouraged to move to the stable state.

The addition angle correction process executed by the addition angle correction unit 25 will be described. As described above, when the estimated motor temperature is equal to or higher than the predetermined temperature, a current stop command is provided from the addition angle correction unit 25 to the command current value changing unit 31 using the overheat protection function. Thus, the γ-axis command current value Iγ* is changed to 0. Accordingly, when the estimated motor temperature becomes equal to or higher than the predetermined temperature, the steering mode is shifted to the manual steer mode where a steering assist force is not generated. When the steering mode is shifted from the power steer mode where a steering assist force is used to the manual steer mode due to an increase in the estimated motor temperature, the steering torque may abruptly change and a shock may be unexpectedly generated in the steering wheel 10. Then, the driver may be surprised. The addition angle correction unit 25 corrects the addition angle α in order to notify the driver of a sign of shift of the steering mode to the manual steer mode before the steering mode is shifted to the manual steer mode due to an increase in the estimated motor temperature.

Figure 8:
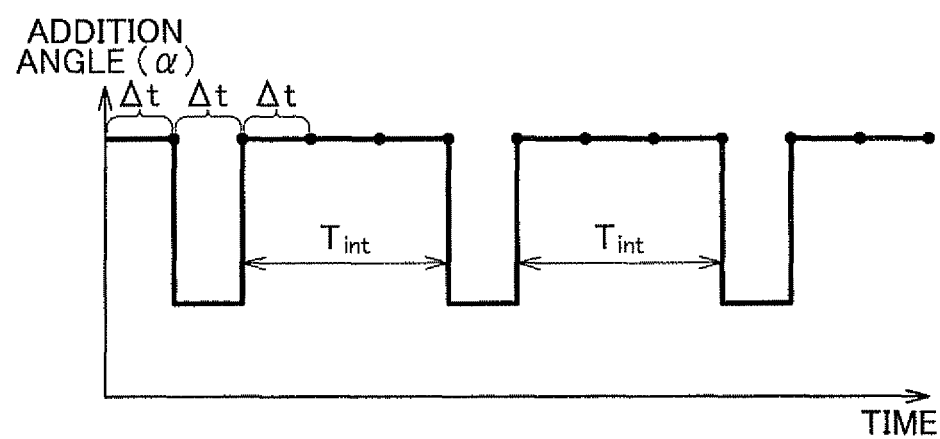
FIG. 8 is a graph for describing the function of an addition angle correction unit.

When the estimated motor temperature is equal to or higher than a first predetermined temperature, the addition angle correction unit 25 intermittently decreases the absolute value of the addition angle α output from the addition angle limiter 24. More specifically, as shown in FIG. 8, when the estimated motor temperature becomes equal to or higher than the first predetermined temperature, the addition angle correction unit 25 temporarily decreases the absolute value of the addition angle α output from the addition angle limiter 24 at the time intervals $T_{int}$. In FIG. 8, Δt signifies the cycle of calculation of the addition angle α. The time interval $T_{int}$ is set to an integral multiple of the cycle Δt of calculation of the addition angle α (in an example in FIG. 8, $T_{int}$=3×Δt).

In this case, the addition angle correction unit 25 sets the time interval $T_{int}$ to a shorter value as the estimated motor temperature is higher. When the time interval $T_{int}$ becomes equal to or shorter than a predetermined threshold, that is, when the estimated motor temperature becomes equal to or higher than a second predetermined temperature that is higher than the first predetermined temperature, the addition angle correction unit 25 notifies the command current value changing unit 31 of a current stop command. Thus, the γ-axis command current value Iγ* is changed to 0, and the steering mode is shifted to the manual steer mode.

Figure 9:
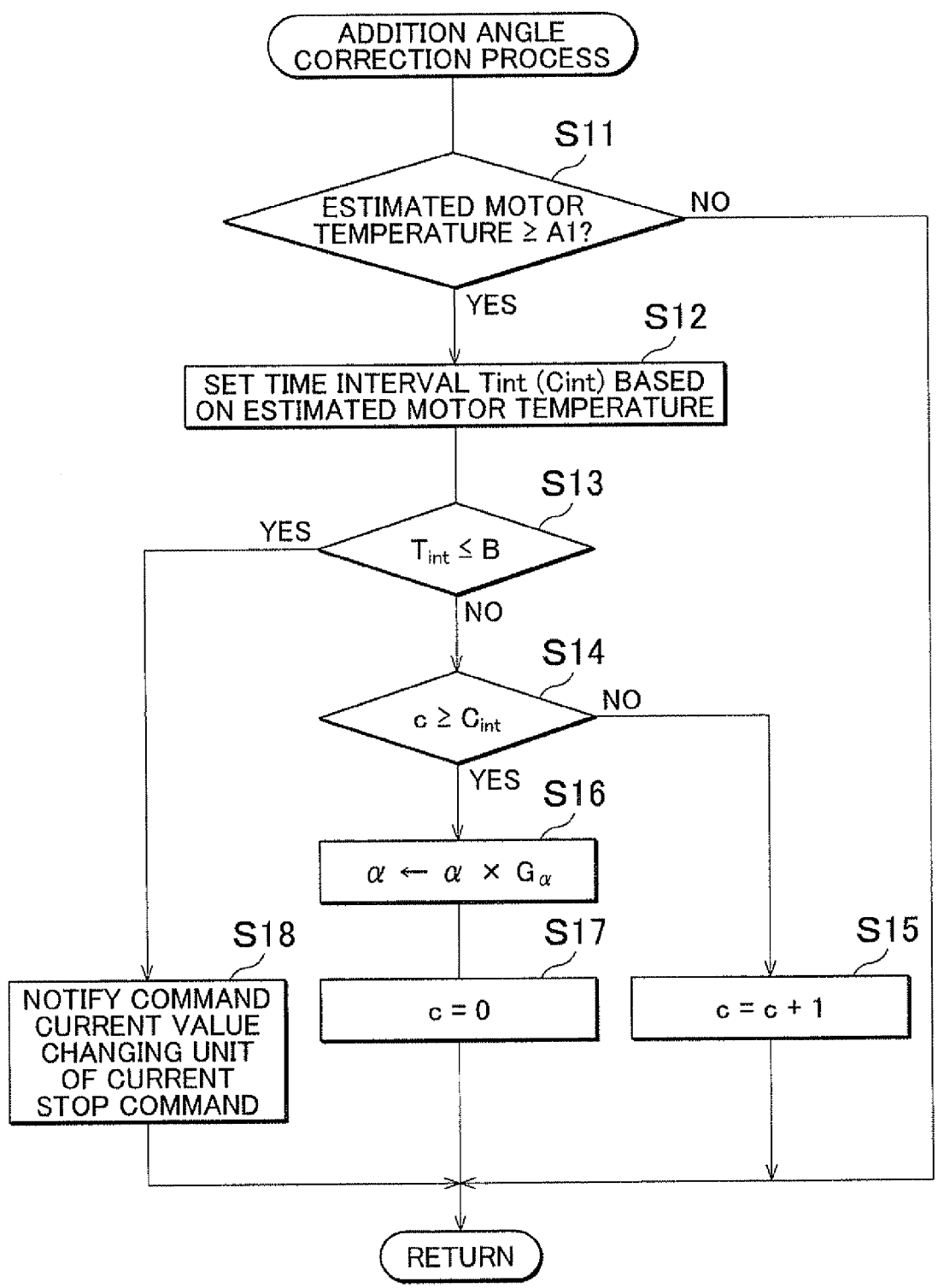
FIG. 9 is a flowchart showing the steps of an addition angle correction process executed by the addition angle correction unit.

FIG. 9 is a flowchart showing the steps of the addition angle correction process executed by the addition angle correction unit 25. The process is repeatedly executed in the same calculation cycles as the cycles of calculation of the addition angle. First, the addition angle correction unit 25 determines whether the estimated motor temperature estimated by the temperature detection/estimation unit 40 is equal to or higher than the first predetermined temperature A1 (S11). The first predetermined temperature A1 is set to, for example, 100° C. When the estimated motor temperature is lower than the first predetermined temperature A1 ("NO" in S11), the addition angle correction unit 25 ends the process in the present calculation cycle without executing any process. In this case, the addition angle α output from the addition angle limiter 24 is provided to the control angle calculation unit 26 without correction.

Figure 10:
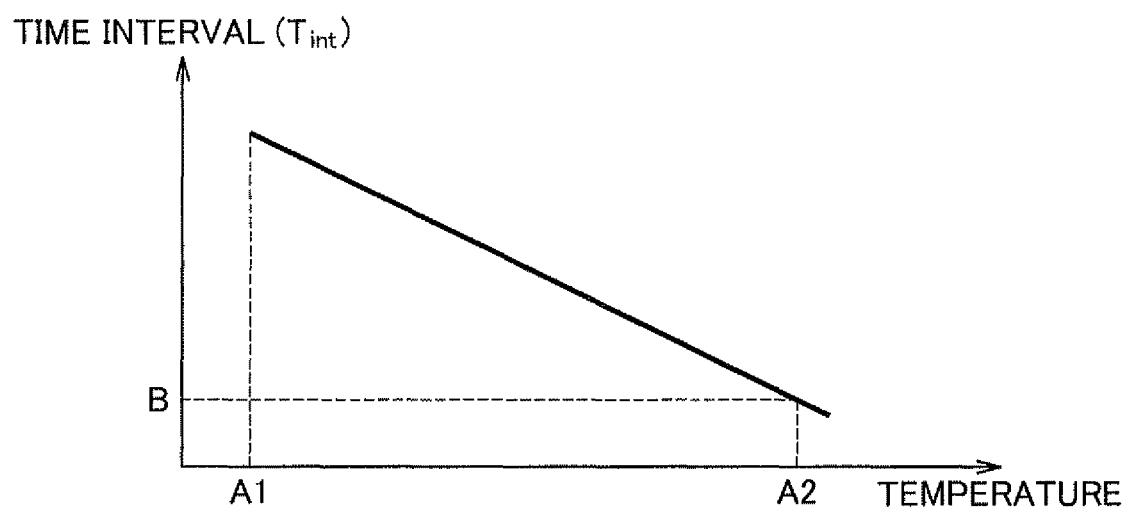
FIG. 10 is a graph showing an example of a manner of setting the time interval with respect to the estimated motor temperature.

When it is determined in S11 that the estimated motor temperature is equal to or higher than the first predetermined temperature A1 ("YES" in S11), the addition angle correction unit 25 sets the time interval $T_{int}$ based on the estimated motor temperature (S12). An example of a manner of setting the time interval $T_{int}$ with respect to the estimated motor temperature is shown in, for example, FIG. 10. In the example in FIG. 10, when the estimated motor temperature is lower than the first predetermined temperature A1, the time interval $T_{int}$ is not set. In the range where the estimated motor temperature is equal to or higher than the first predetermined temperature A1, the time interval $T_{int}$ is set so as to decrease (linearly decrease in the example in FIG. 10) as the estimated motor temperature increases. The addition angle correction unit 25 sets the time interval $T_{int}$ according to the map in which the relationship between the estimated motor temperature and the time interval $T_{int}$ as shown in FIG. 10 is stored. Note that the value obtained by converting the time interval $T_{int}$ into the number of times of the calculation cycles is expressed by $C_{int}$.

After setting the time interval $T_{int}$, the addition angle correction unit 25 determines whether the set time interval $T_{int}$ is equal to or shorter than a predetermined threshold B (S13). As shown in FIG. 10, the threshold B corresponds to the time interval $T_{int}$ when the estimated motor temperature is equal to the second predetermined temperature A2 that is higher than the first predetermined temperature A1. The second predetermined temperature A2 is set to, for example, 180° C. When the time interval $T_{int}$ is longer than the threshold B, that is, when the estimated motor temperature is lower than the second predetermined temperature A2 ("NO" in S13), the addition angle correction unit 25 determines whether a count value c has reached the time interval $C_{int}$ (S14). The initial value of the count value is 0. When the count value c has not reached the time interval $C_{int}$ ("NO" in S14), the addition angle correction unit 25 increments the count value c by 1 (S15), and ends the process in the present calculation cycle. In this case, the addition angle α output from the addition angle limiter 24 is provided to the control angle calculation unit 26 without correction.

When it is determined in S14 that the count value c has reached the time interval $C_{int}$ ("YES" in S14), the addition angle correction unit 25 corrects the addition angle α such that the absolute value of the addition angle α decreases, by multiplying the addition angle α output from the addition angle limiter 24 by a predetermined addition angle gain $G_α$ ($0<G_α<1$) that is higher than 0 and lower than 1 (S16). The addition angle gain $G_α$ is set to, for example, a value within a range from 0.5 to 0.9. Then, the addition angle correction unit 25 resets the counter value c to 0 (c=0) (S17), and ends the process in the present calculation cycle. In this case, the addition angle α output from the addition angle limiter 24 is corrected such that the absolute value thereof decreases, and is then provided to the control angle calculation unit 26.

When it is determined in S13 that the time interval $T_{int}$ is equal to or shorter than the threshold B, that is, when the estimated motor temperature is equal to or higher than the second predetermined temperature A2 ("YES" in S13), the addition angle correction unit 25 notifies the command current value changing unit 31 of a current stop command using the overheat protection function (S18). Thus, the γ-axis command current value Iγ* is changed to 0, and the steering mode is shifted to the manual steer mode. The addition angle correction unit 25 ends the process in the present calculation cycle.

As described above, when the estimated motor temperature becomes equal to or higher than the first predetermined temperature A1, the addition angle correction unit 25 temporarily decreases the absolute value of the addition angle α output from the addition angle limiter 24 at the time intervals $T_{int}$. When the absolute value of the addition angle α is temporarily decreased, the absolute value of the assist torque decreases. Therefore, the absolute value of the steering torque temporarily increases. Thus, the steering wheel 10 temporarily becomes stiff.

The time interval $T_{int}$ is made shorter as the estimated motor temperature becomes higher. Therefore, when the estimated motor temperature exceeds the first predetermined temperature A1 and keeps increasing, the time interval at which the steering wheel becomes stiff gradually decreases. When the estimated motor temperature reaches the second predetermined value A2, the γ-axis command current value Iγ* is brought to 0 and the steering mode is shifted to the manual steer mode. As described above, when the steering mode is shifted from the power steer mode to the manual steer mode, the steering torque may abruptly change and a shock may be unexpectedly generated in the steering wheel 10. Then, the driver may be surprised.

In the first embodiment, when the estimated motor temperature becomes equal to or higher than the first predetermined temperature A1, the steering wheel 10 intermittently becomes stiff. When the estimated motor temperature further increases, the time interval at which the steering wheel 10 becomes stiff gradually decreases. Thus, it is possible to notify the driver of a sign of shift to the manual steer mode before the steering mode is shifted to the manual steer mode. Therefore, it is possible to give an advance notice of shift to the manual steer mode. Accordingly, even if a shock is generated due to shift of the steering mode to the manual steer mode after the notice, the driver is not surprised because the driver can predict generation of the shock.

When the addition angle α is controlled such that the load angle $θ_L$ is adjusted in the region where there is a negative correlation between the load angle $θ_L$ and the motor torque (assist torque), the addition angle correction unit 25 temporarily increases the absolute value of the addition angle α output from the addition angle limiter 24 at the time intervals $T_{int}$ when the estimated motor temperature becomes equal to or higher than the predetermined temperature A1. That is, the above-described addition angle gain $G_α$ is set to a value that is higher than 1, for example, a value that is higher than 1 and lower than 2 ($1<G_α<2$).

Figure 11:
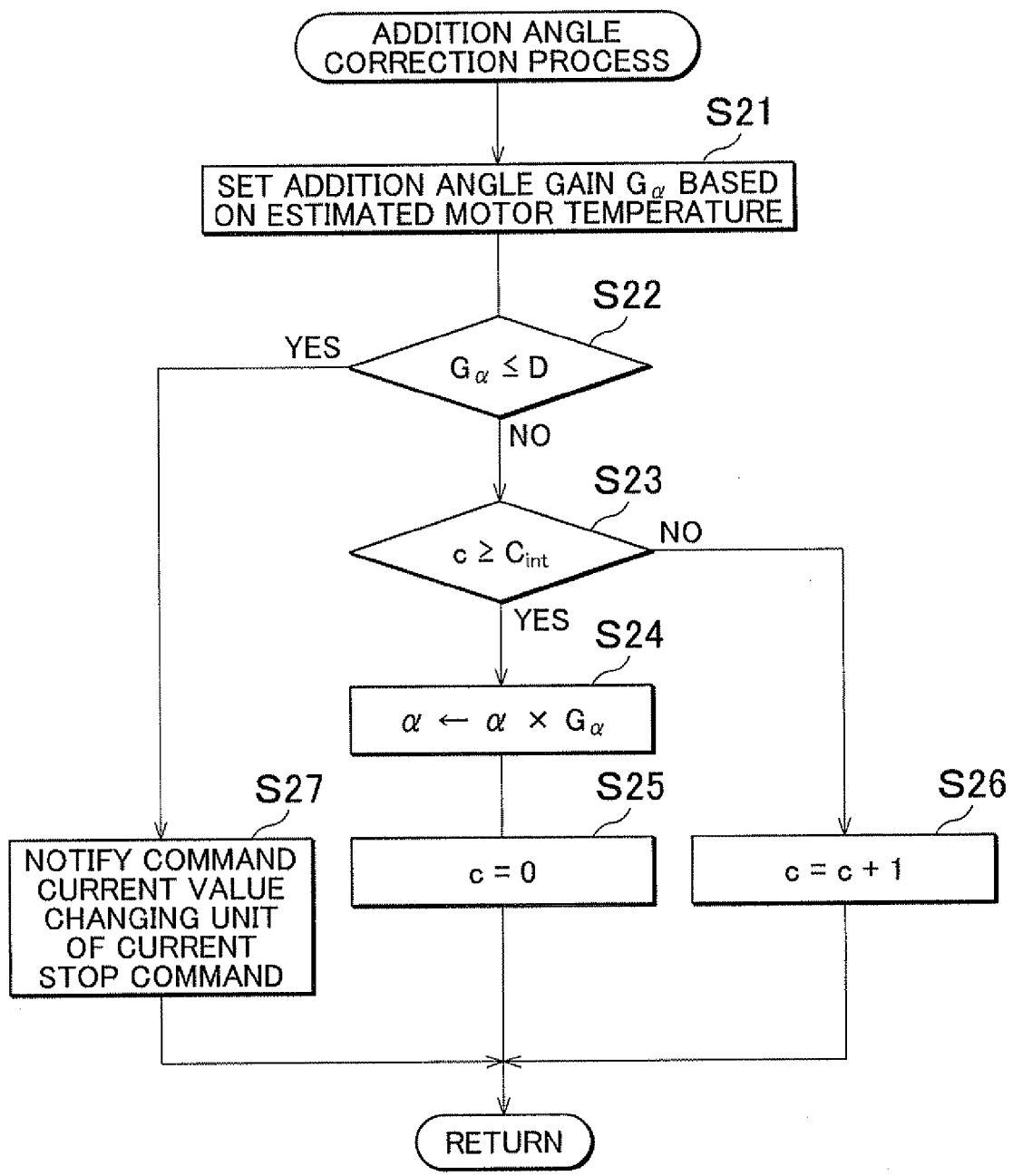
FIG. 11 is a flowchart showing another example of the operation of the addition angle correction unit.

FIG. 11 is a flowchart showing another example of the operation of the addition angle correction unit 25. In this example as well, when the estimated motor temperature becomes equal to or higher than the first predetermined temperature A1, the addition angle correction unit 25 intermittently deceases the absolute value of the addition angle α output from the addition angle limiter 24, as shown in FIG. 8. However, in this example, the time interval $T_{int}$ is kept constant unlike above-described example. Instead, the addition angle correction unit 25 decreases the value of the addition angle gain $G_α$ ($0<G_α<1$) as the estimated motor temperature increases.

Figure 12:
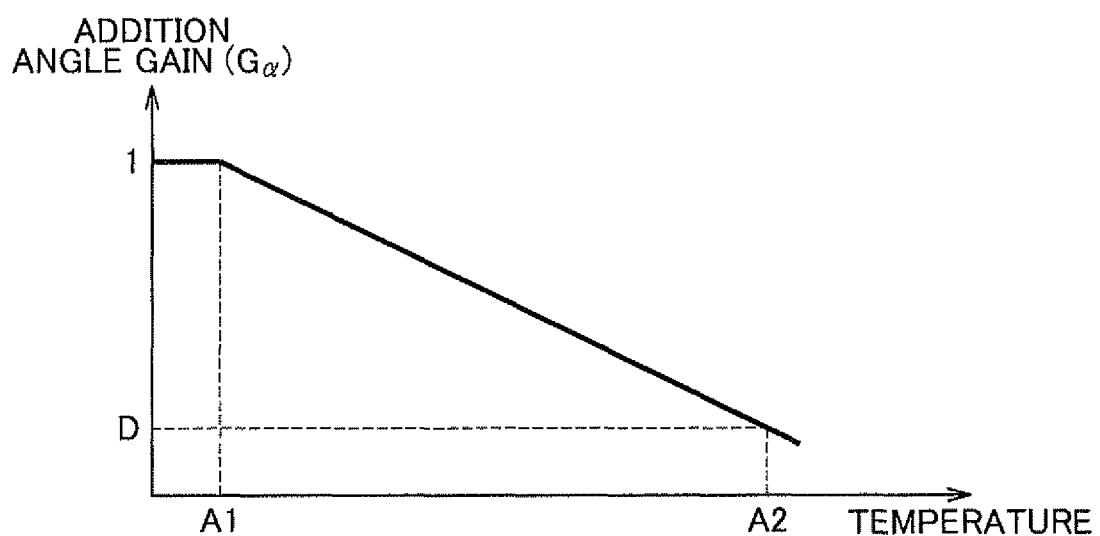
FIG. 12 is a graph showing an example of a manner of setting the addition angle gain with respect to the estimated motor temperature.

The process shown in FIG. 11 is repeatedly executed in the same calculation cycles as the cycles of calculation of the addition angle α. First, the addition angle correction unit 25 sets the addition angle gain $G_α$ based on the estimated motor temperature (S21). An example of a manner of setting the addition angle gain $G_α$ with respect to the estimated motor temperature is shown in, for example, FIG. 12. In the example in FIG. 12, the addition angle gain $G_α$ is set to 1 in the range where the estimated motor temperature is lower than the first predetermined temperature A1. In the range where the estimated motor temperature is equal to or higher than the first predetermined temperature A1, the addition angle gain $G_α$ is set to decrease (linearly decrease in the example in FIG. 12) as the estimated motor temperature increases. The addition angle correction unit 25 sets the addition angle gain $G_α$ according to the map in which the relationship between the estimated motor temperature and the addition angle gain $G_α$ as shown in FIG. 12 is stored.

After setting the addition angle gain $G_α$, the addition angle correction unit 25 determines whether the set addition angle gain $G_α$ is equal to or lower than a predetermined threshold D (S22). As shown in FIG. 12, the threshold D corresponds to the addition angle gain $G_α$ when the estimated motor temperature is equal to the second predetermined temperature A2 that is higher than the first predetermined temperature A1. When the addition angle gain $G_α$ is higher than the threshold D, that is, when the estimated motor temperature is lower than the second predetermined temperature A2 ("NO" in S22), the addition angle correction unit 25 determines whether the count value c has reached the time interval $C_{int}$ (S23). The initial value of the count value c is 0. The time interval $C_{int}$ is a constant value, and set in advance. When the count value c has not reached the time interval $C_{int}$ ("NO" in S23), the addition angle correction unit 25 increments the count value c by 1 (S26), and ends the process in the present calculation cycle. In this case, the addition angle α output from the addition angle limiter 24 is provided to the control angle calculation unit 26 without correction.

When it is determined in S23 that the count value c has reached the time interval $C_{int}$ ("YES" in S23), the addition angle correction unit 25 corrects the addition angle α by multiplying the addition angle α output from the addition angle limiter 24 by the addition angle gain $G_α$ set in S21 (S24). Then, the addition angle correction unit 25 resets the counter value c to 0 (C=0) (S25), and ends the process in the present calculation cycle. In this case, the addition angle α output from the addition angle limiter 24 is corrected by the addition angle correction unit 25, and then provided to the control angle calculation unit 26. Especially, when the estimated motor temperature is higher than the first predetermined temperature, the addition angle α is corrected such that the absolute value thereof decreases, and then provided to the control angle calculation unit 26.

When it is determined in S22 that the addition angle gain $G_α$ is equal to or lower than the threshold D, that is, the estimated motor temperature is equal to or higher than the second predetermined value A2 ("YES" in S22), the addition angle correction unit 25 notifies the command current value changing unit 31 of a current stop command using the overheat protection function (S27). Thus, the γ-axis command current value Iγ* is brought to 0 and the steering mode is shifted to the manual steer mode. The addition angle correction unit 25 ends the process in the present calculation cycle.

As described above, when the estimated motor temperature becomes higher than the first predetermined temperature A1, the addition angle correction unit 25 temporarily decreases the absolute value of the addition angle α by multiplying the addition angle α output from the addition angle limiter 24 by the addition angle gain $G_α$ ($0<G_α<1$) at the time intervals $T_{int}$. Thus, the steering wheel 10 intermittently becomes stiff.

The addition angle gain $G_α$ is decreased as the estimated motor temperature increases. Accordingly, when the estimated motor temperature exceeds the predetermined temperature A1 and keeps increasing, the degree of the stiffness of the steering wheel 10, which is set at the time intervals $T_{int}$, gradually increases. When the estimated motor temperature reaches the second predetermined temperature A2, the γ-axis command current value Iγ* is brought to 0 and the steering mode is shifted to the manual steer mode.

In this operation example, when the estimated motor temperature becomes equal to or higher than the first predetermined temperature A1, the steering wheel 10 intermittently becomes stiff. Then, if the estimated motor temperature further increases, the degree of the stiffness of the steering wheel 10, which is intermittently set, gradually increases. Thus, it is possible to notify the driver of a sign of shift to the manual steer mode before the steering mode is shifted to the manual steer mode. Therefore, it is possible to give an advance notice of shift to the manual steer mode. Accordingly, even if a shock is generated due to shift of the steering mode to the manual steer mode after the notice, the driver is not surprised because the driver can predict the generation of the shock.

When the addition angle α is controlled such that the load angle $\theta_L$ is adjusted in the region where there is a negative correlation between the load angle $\theta_L$ and the motor torque (assist torque), the addition angle correction unit 25 increases the absolute value of the addition angle α as the estimated motor temperature increases when the estimated motor temperature becomes equal to or higher than the first predetermined temperature A1. More specifically, the above-described addition angle gain $G_\alpha$ is set to a higher value within the range equal to or higher than 1 and equal to or lower than 2 (1≤Ga≤2) as the estimated motor temperature increases.

Figure 13:
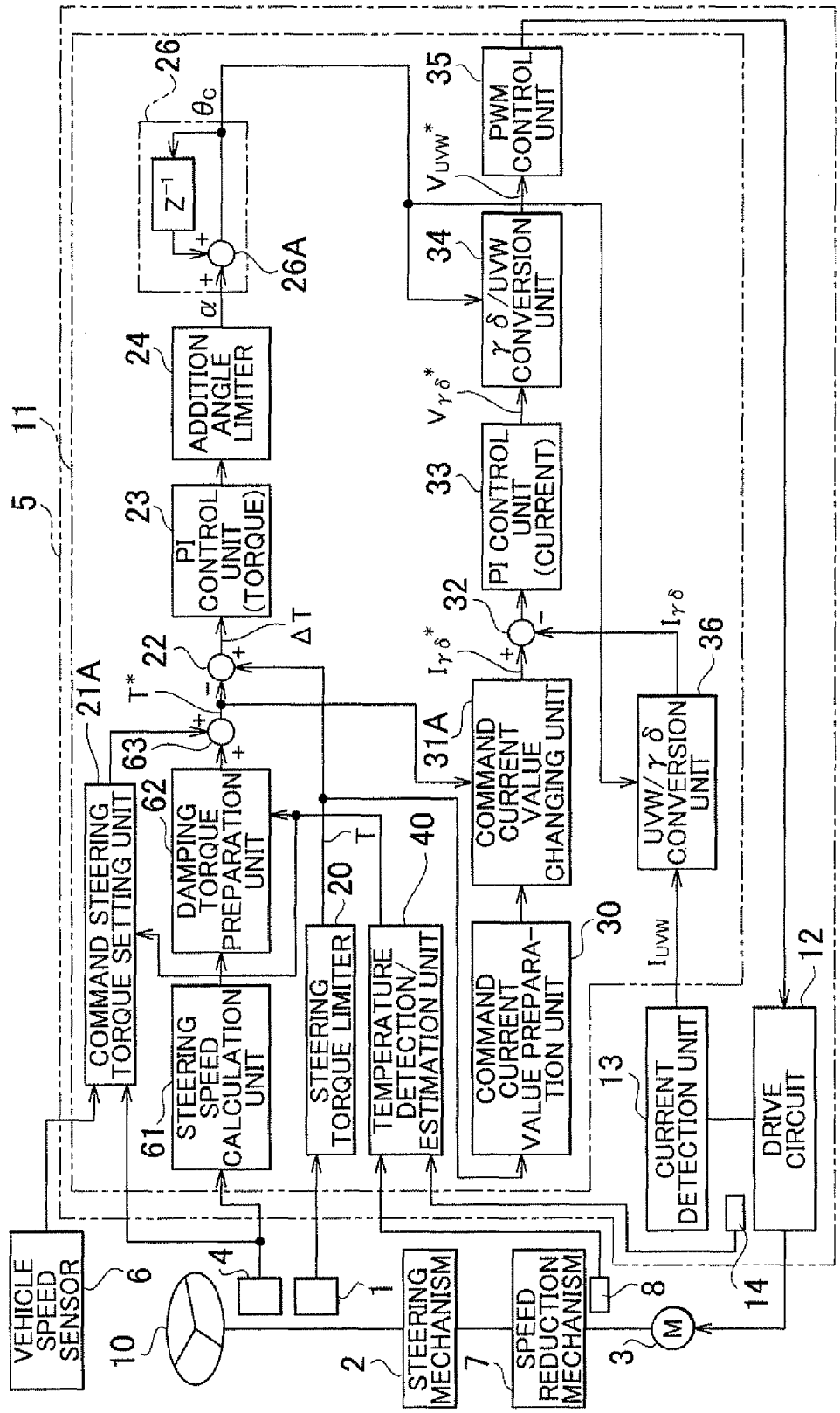
FIG. 13 is a block diagram for describing the electrical configuration of an electric power steering system according to a second embodiment of the invention.

FIG. 13 is a block diagram for describing the configuration of an electric power steering system according to a second embodiment of the invention. In FIG. 13, the portions corresponding to those in FIG. 1 are denoted by the same reference numerals as those in FIG. 1. In the second embodiment, the addition angle correction unit 25 shown in FIG. 1 is not provided. In the second embodiment, a command steering torque setting unit 21A is provided instead of the command steering torque 21 shown in FIG. 1, and a command current value changing unit 31A is provided instead of the command current value changing unit 31. In addition, in the second embodiment, the microcomputer 11 includes a steering speed calculation unit 61, a damping torque preparation unit 62 and a torque command value addition unit 63, as the function processing units. The command steering torque setting unit 21A, the damping torque setting unit 62 and the torque command value addition unit 63 may be used as the control angle correction unit according to the invention.

The temperature detection/estimation unit 40 detects or estimates the temperature of the motor 3 or the motor control unit 5 (temperature of the drive circuit 12). In the second embodiment as well, the temperature detection/estimation unit 40 estimates the temperature of the motor 3, for convenience of explanation. The command steering torque setting unit 21A sets the command steering torque based on the steering angle detected by the steering angle sensor 4, the vehicle speed detected by the vehicle speed sensor 6 and the estimated motor temperature estimated by the temperature detection/estimation unit 40. The command steering torque set by the command steering torque setting unit 21A is provided to the torque command value addition unit 63.

Figure 14A:
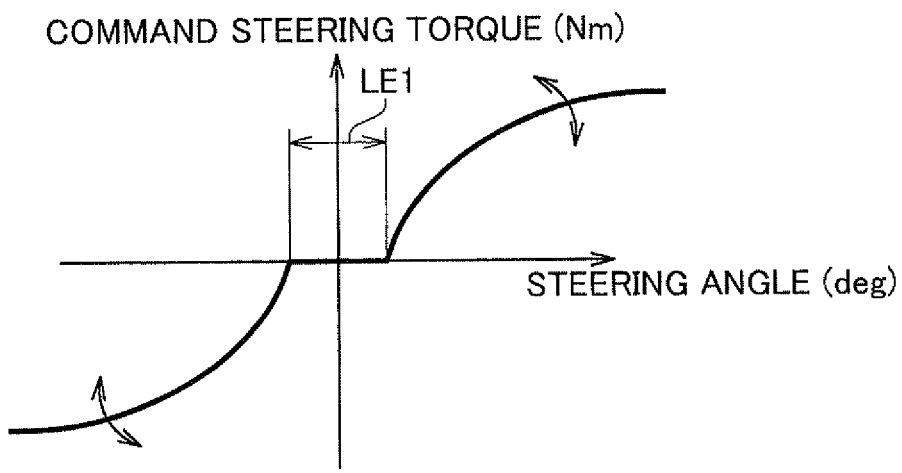
FIG. 14A is a graph showing an example of a manner of setting the command steering torque with respect to the steering angle.

FIG. 14A shows an example of a manner of setting the command steering torque with respect to the steering angle. In the example in FIG. 14A, the command steering torque is set to 0 in the region LE1 where the steering angle is near 0, the command steering torque is set to a positive value (torque applied in the clockwise direction) in the region where the steering angle is a positive value that falls outside the region LE1, and the command steering torque is set to a negative value (torque applied in the counterclockwise direction) in the region where the steering angle is a negative value that falls outside the region LE1. When the steering angle falls outside the region LE1, the absolute value of the command steering torque monotonously increases as the absolute value of the steering angle increases. Further, the command steering torque is set such that the absolute value thereof decreases as the vehicle speed increases. That is, a vehicle speed-sensitive control is executed. Further, the command steering torque is set such that the absolute value thereof increases as the estimated motor temperature increases when the estimated motor temperature is higher than a predetermined temperature.

More specifically, the command steering torque setting unit 21A first sets the command steering torque based on the steering angle and the vehicle speed, and then multiples the set command steering torque by the torque gain $G_T$ set based on the estimated motor temperature, thereby setting the final command steering torque. The command steering torque setting unit 21A may first set the first command steering torque based on the steering angle, and then multiply the set first command steering torque by the torque gain $G_T$ set based on the estimated motor temperature, thereby setting the second command steering torque. Then, the command steering torque setting unit 21A may set the final command steering torque by correcting the second command steering torque based on the vehicle speed.

Figure 14B:
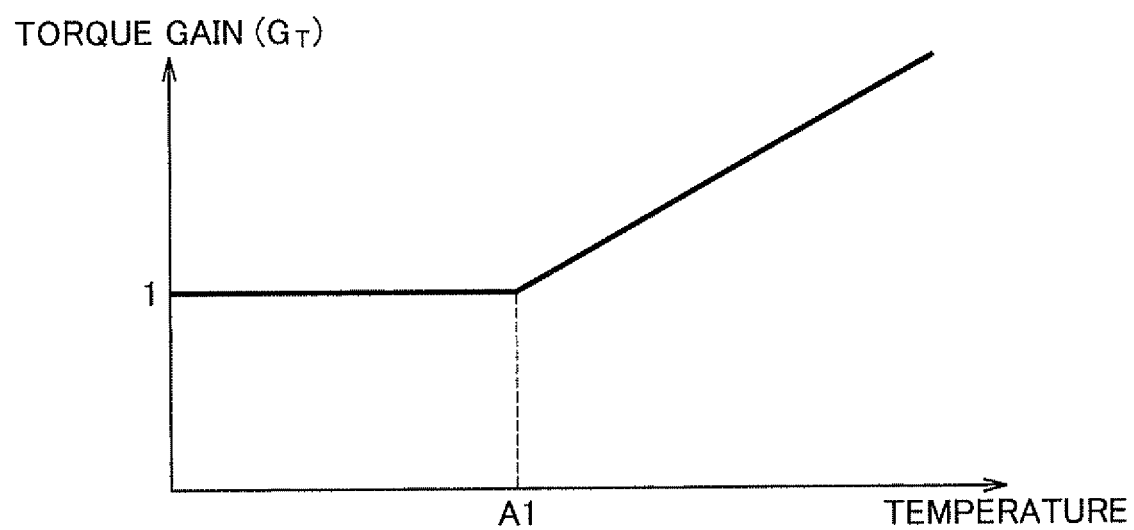
FIG. 14B is a graph showing an example of a manner of setting the torque gain with respect to the estimated motor temperature.

FIG. 14B shows an example of a manner of setting the torque gain $G_T$ with respect to the estimated motor temperature. When the estimated motor temperature is equal to or lower than the predetermined temperature A1 (e.g. 100° C.), the torque gain $G_T$ is set to 1. When the estimated motor temperature is higher than the predetermined temperature A1, the torque gain $G_T$ is increased (linearly increased in the example in FIG. 14B) as the estimated motor temperature increases.

The steering speed calculation unit 61 calculates the steering speed by executing temporal differentiation on the steering angle detected by the steering angle sensor 4. The damping torque preparation unit 62 prepares a damping torque command value for a damping control based on the steering speed calculated by the steering speed calculation unit 61 and the estimated motor temperature estimated by the temperature detection/estimation unit 40. The damping torque command value prepared by the damping torque preparation unit 6 is provided to the torque command value addition unit 63. The torque command value addition unit 63 adds the damping torque command value prepared by the damping torque preparation unit 62 to the command steering torque set by the command steering torque setting unit 21A. The result of addition is provided to the torque deviation calculation unit 22, as the command steering torque T* to which a correction for damping control has been made. Therefore, the command steering torque setting unit 21A, the damping torque preparation unit 62 and the torque command value addition unit 63 constitute a command torque setting unit that sets the command steering torque T*.

Figure 15A:
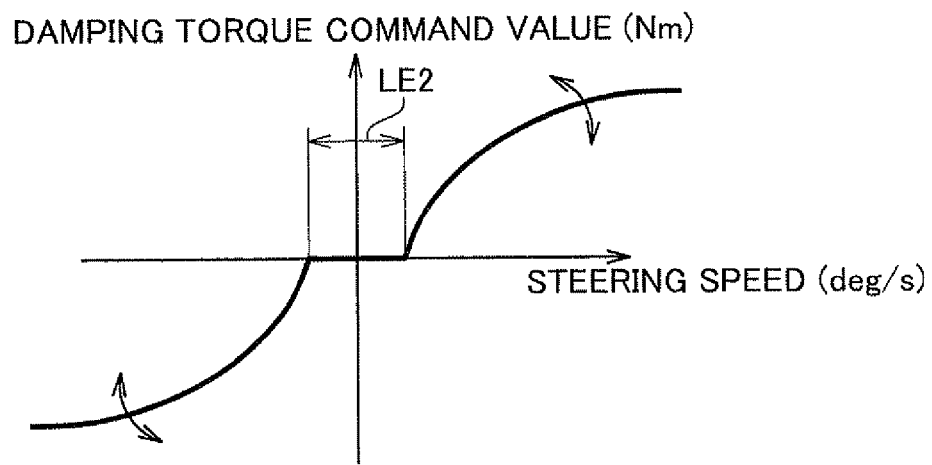
FIG. 15A is a graph showing an example of a manner of setting the damping torque command value with respect to the steering speed.

FIG. 15A shows an example of a manner of setting the damping torque command value with respect to the steering speed. In the example in FIG. 15A, the damping torque command value is set to 0 in the region LE2 where the steering speed is near 0, the damping torque command value is set to a positive value in the region where the steering speed is a positive value that falls outside the region LE2, and the damping torque command value is set to a negative value in the region where the steering speed is a negative value that falls outside the region LE2. When the steering speed falls outside the region LE2, the absolute value of the damping torque command value monotonously increases as the absolute value of the steering speed increases. Thus, the absolute value of the damping torque command value increases as the steering speed of the steering wheel 19 increases. The damping torque command value thus set is added to the command steering torque set by the command steering torque setting unit 21A. Accordingly, the absolute value of the command steering torque T* increases as the absolute value of the steering speed increases. Thus, the motor torque (assist torque) decreases, and the damping control is realized.

Further, when the estimated motor temperature is higher than a predetermined temperature, the damping torque command value is set in such a manner that the absolute value thereof increases as the estimated motor temperature increases. More specifically, the damping torque preparation unit 62 first sets the damping torque command value based on the steering speed, and then multiplies the set damping torque command value by the damping torque gain $G_{DT}$ set based on the estimated motor temperature, thereby setting the final damping torque command value.

Figure 15B:
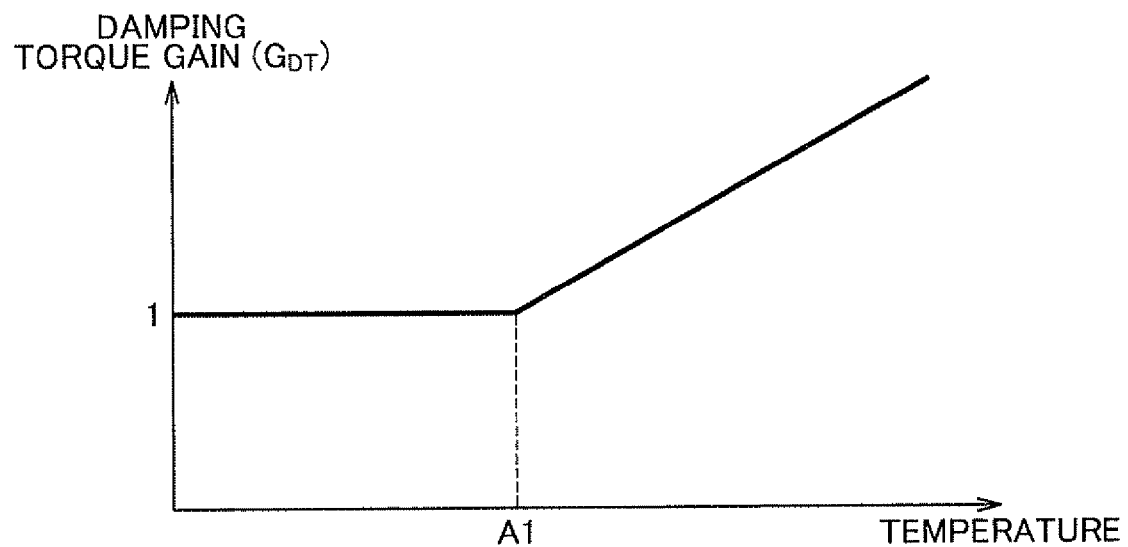
FIG. 15B is a graph showing an example of a manner of setting the damping torque gain with respect to the estimated motor temperature.

FIG. 15B shows an example of a manner of setting the damping torque gain $G_{DT}$ with respect to the estimated motor temperature. When the estimated motor temperature is equal to or lower than the predetermined temperature A1, the damping torque gain $G_{DT}$ is set to 1. When the estimated motor temperature is higher than the predetermined temperature A1, the damping torque gain $G_{DT}$ increases (linearly increases in the example in FIG. 5B) as the estimated motor temperature increases.

The command current value changing unit 3A changes the γ-axis command current Iγ* prepared by the command current value preparation unit 30 based on the command steering torque T* output from the torque command value addition unit 63. More specifically, when the absolute value of the command steering torque T* becomes equal to or higher than a predetermined threshold E, the command current value changing unit 31A changes the γ-axis command current Iγ* prepared by the command current value preparation unit 30 to 0 using the overheat protection function. Therefore, when the absolute value of the command steering torque T* becomes equal to or higher than the predetermined threshold E, the steering mode is shifted to the manual steer mode. The threshold E is set to, for example, 7 Nm.

When the estimated motor temperature becomes higher than the predetermined temperature A1, the absolute value of the command steering torque set by the command steering torque setting unit 21A increases as the estimated motor temperature increases. Also, when the estimated motor temperature becomes higher than the predetermined temperature A1, the absolute value of the damping torque command value prepared by the damping torque preparation unit 62 increases as the estimated motor temperature increases. The command steering torque set by the command steering torque setting unit 21A and the damping torque command value prepared by the damping torque preparation unit 62 are added together by the torque command value addition unit 63, whereby the command steering torque T* is prepared. Therefore, the absolute value of the command steering torque T* increases as the estimated motor temperature increases.

When the absolute value of the command steering torque T* increases, the absolute value of the assist torque decreases. Therefore, the steering wheel 10 becomes stiff. That is, when the estimated motor temperature is higher than the predetermined temperature A1, the steering wheel 10 is stiffer than when the estimated motor temperature is relatively low. Then, as the estimated motor temperature increases, the stiffness of the steering wheel 10 increases. When the estimated motor temperature further increases and the absolute value of the command steering torque T* exceeds the predetermined threshold E, the γ-axis command current Iγ* is changed to 0 by the command current value changing unit 31A. Thus, the steering mode is shifted to the manual steer mode.

In the second embodiment, when the estimated motor temperature increases to a value equal to or higher than the predetermined temperature A1, the steering wheel 10 becomes stiff. When the estimated motor temperature further increases, the stiffness of the steering wheel 10 further increases as the estimated motor temperature increases. Thus, it is possible to notify the driver of a sign of shift to the manual steer mode before the steering mode is shifted to the manual steer mode. Accordingly, it is possible to give an advance notice of shift to the manual steer mode. Therefore, even if a shock is generated due to shift of the steering mode to the manual steer mode after the notice, the driver is not surprised because the driver can predict generation of the shock.

In the second embodiment, when the estimated motor temperature is higher than the predetermined temperature, each of both the command steering torque setting unit 21A and the damping torque preparation unit 62 sets the torque command value in such a manner that the absolute value of the torque command value (command steering torque, damping torque command value) increases as the estimated motor temperature increases. Alternatively, one of the command steering torque setting unit 21A and the damping torque preparation unit 62 may set the torque command value based on the estimated motor temperature.

Figure 16:
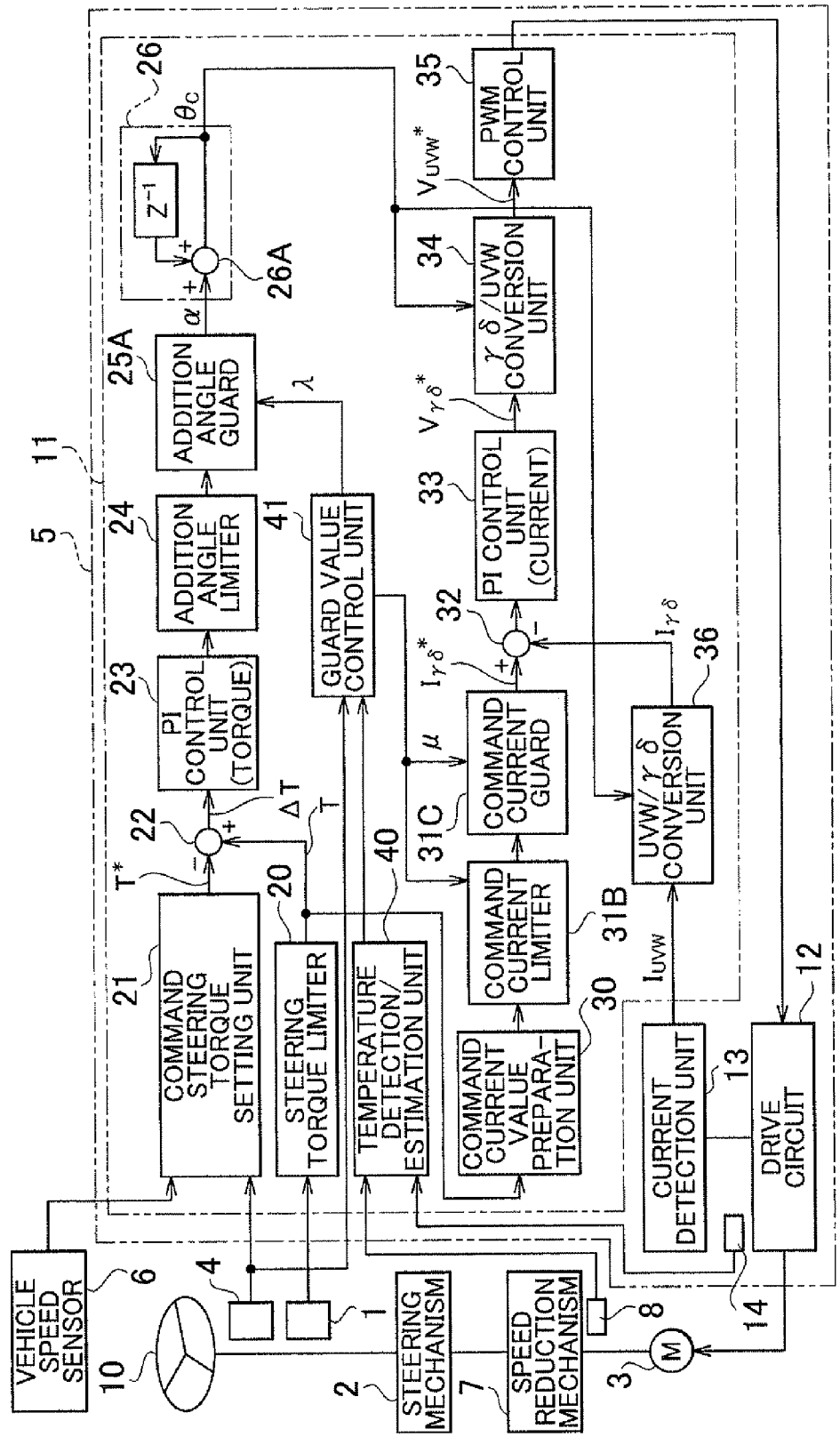
FIG. 16 is a block diagram for describing the electrical configuration of an electric power steering system according to a third embodiment of the invention.

FIG. 16 is a block diagram for describing the configuration of an electric power steering system according to a third embodiment of the invention. In FIG. 16, the portions corresponding to those in FIG. 1 are denoted by the same reference numerals as those in FIG. 1. In the third embodiment, the addition angle correction unit 25 and the command current value changing unit 31 shown in FIG. 1 are not provided. In the third embodiment, the microcomputer 11 includes an addition angle guard 25A, a command current limiter 31B, a command current guard 31C and a guard value control unit 41, as function processing units. The addition angle guard 25A and the guard value control unit 41 may be used as the control angle correction unit according to the invention.

The temperature detection/estimation unit 40 detects or estimates the temperature of the motor 3 or the motor control unit 5 (temperature of the drive circuit 12). In the third embodiment as well, the temperature detection/estimation unit 40 estimates the temperature of the motor 3, for convenience of explanation. The guard value control unit 41 executes a guard value control process based on the estimated motor temperature estimated by the temperature detection/estimation unit 40 and the steering angle detected by the steering angle sensor 4. The details of the guard value control process will be described later.

The command current limiter 31B limits the γ-axis command current Iγ* prepared by the command current value preparation unit 30 to a value equal to or lower than an overheat protection limited current value that is set by the guard value control unit 41. The command current guard 31C corrects the γ-axis command current Iγ* output from the command current limiter 31B based on the command current guard value μ(μ>0) set by the guard value control unit 41. More specifically, the command current guard 31C corrects (limits) the γ-axis command current Iγ* to a value equal to or lower than the command current guard value μ.

Figure 17:
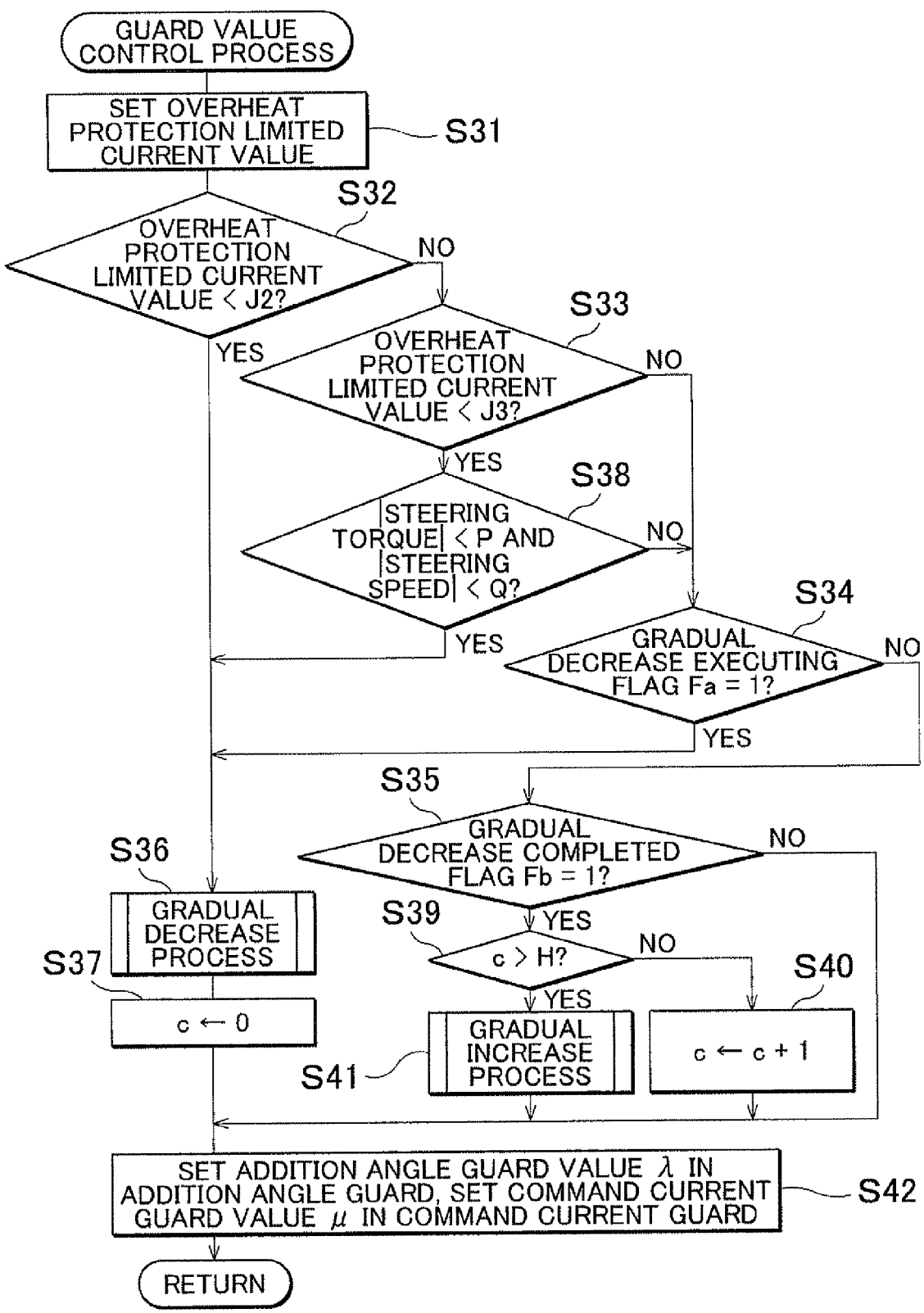
FIG. 17 is a flowchart showing the steps of a guard value control process executed by a guard value control unit.

The addition angle guard 25A corrects the absolute value of the addition angle α output from the addition angle limiter 24 based on the addition angle guard value μ (μ>0) set by the guard value control unit 41. More specifically, the addition angle guard 25A corrects (limits) the absolute value of the addition angle α to a value equal to or smaller than the addition angle guard value λ. FIG. 17 is a flowchart showing the steps of a guard value control process executed by the guard value control unit 41. The process in FIG. 17 is repeatedly executed in predetermined calculation cycles.

The guard value control unit 41 calculates the overheat protection limited current value based on the estimated motor temperature estimated by the temperature detection/estimation unit 40, and sets the overheat protection limited current value in the command current limiter 31B (S31). The command current limiter 31B limits the γ-axis command current Iγ* prepared by the command current value preparation unit 30 to a value equal to or lower than the overheat protection limited current value set by the guard value control unit 41. More specifically, when the γ-axis command current Iγ* prepared by the command current value preparation unit 30 is equal to or lower than the overheat protection limited current value, the command current limiter 31B outputs the γ-axis command current Iγ* without correction. On the other hand, when the γ-axis command current Iγ* prepared by the command current value preparation unit 30 is higher than the overheat protection limited current value, the command current limiter 31B outputs the overheat protection limited current value as the γ-axis command current Iγ*.

Figure 18:
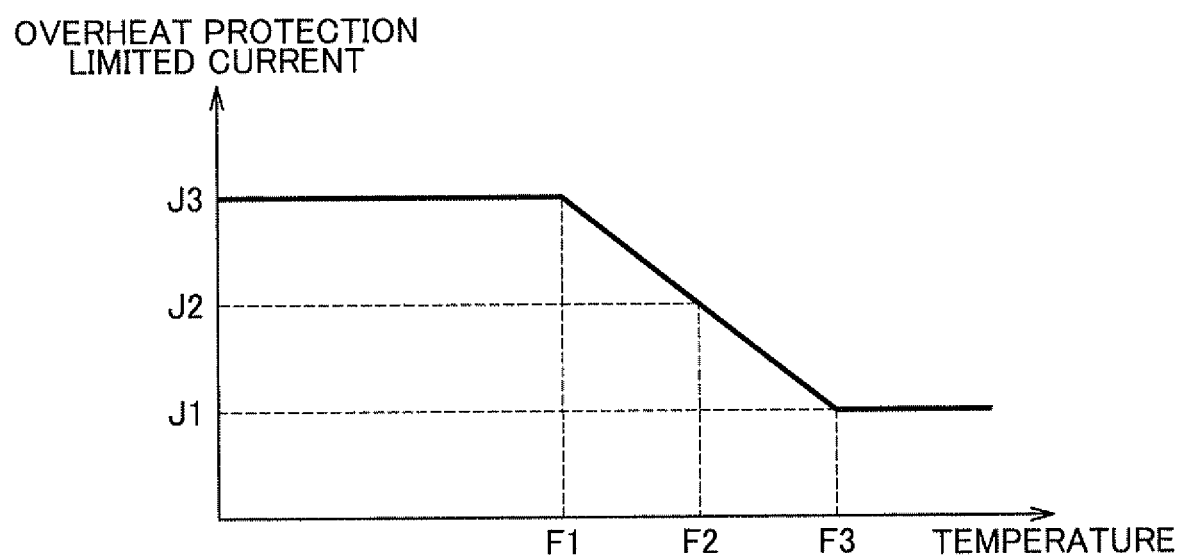
FIG. 18 is a graph showing an example of a manner of setting the overheat protection limited current with respect to the estimated motor temperature.

FIG. 18 shows an example of a manner of setting an overheat protection limited current with respect to the estimated motor temperature. When the estimated motor temperature is lower than a predetermined temperature F1, the overheat protection limited current value is set to a relatively high value J3. The predetermined temperature F1 is set to, for example, 100° C. When the estimated motor temperature is higher than a predetermined temperature F3 that is higher than the predetermined temperature F1, the overheat protection limited current value is set to a relatively low value J1. When the estimated motor temperature is within a range equal to or higher than the predetermined temperature F1 and equal to or lower than the predetermined temperature F3, the overheat protection limited current value decreases (linearly decreases in the example in FIG. 18) as the estimated motor temperature increases. The overheat protection limited current value that corresponds to a substantially intermediate value F2 between the predetermined temperature F1 and the predetermined temperature F3 is set as an intermediate value J2. The temperature at the intermediate value F2 is set to, for example, 140° C.

When the process in S31 is completed, the guard value control unit 41 determines whether the overheat protection limited current value calculated in S31 is lower than the predetermined value J2 (see FIG. 18) (S32). When the overheat protection limited current value is equal to or higher than the predetermined value J2 ("NO" in S32), that is, when the estimated motor temperature is equal to or lower than the predetermined temperature F2 (see FIG. 18), the guard value control unit 41 determines whether the overheat protection limited current value is lower than the predetermined value J3 (see FIG. 18) (S33).

When the overheat protection limited current value is equal to or higher than the predetermined value J3 ("NO" in S33), that is, when the estimated motor temperature is equal to or lower than the predetermined temperature F1 (see FIG. 18) (is a relatively low temperature) ("NO" in S33), the guard value control unit 41 determines whether the gradual decrease executing flag Fa has been set (Fa=1) (S34). The gradual decrease executing flag Fa is a flag for memorizing the fact that the gradual decrease process (process in S36), described later in detail, is being executed. When the gradual decrease process is being executed, the gradual decrease flag is set (Fa=1). When the gradual decrease process is not being executed, the gradual decrease flag is reset (Fa=0).

When the gradual decrease executing flag Fa has been reset ("NO" in S34), the guard value control unit 41 determines whether the gradual decrease completed flag Fb has been set (Fb=1) (S35). The gradual decrease completed flag Fb is a flag for memorizing the fact that the gradual decrease process has been completed. The gradual decrease completed flag Fb is set (Fb=1) when the gradual decrease process (process in S36), described later in detail, has been completed, and is reset (Fb=0) when the gradual increase process (process in S41), described later in detail, has been completed.

When the gradual decrease completed flag Fb has been reset (Fb=0) ("NO" in S35), the guard value control unit 41 sets the presently stored addition angle guard value λ in the addition angle guard 25A, and sets the presently stored command current guard value μ (γ-axis command current guard value) in the command current guard 31C(S42). Then, the process in the present calculation cycled ends. The initial value of the addition angle guard value λ is set to, for example, the upper limit $\lambda_{max}$ of the addition angle guard value λ, and the initial value of the command current guard value μ is set to the upper limit $\mu_{max}$ of the command current guard value μ.

When it is determined in S32 that the overheat protection limited current value is lower than the predetermined value J2 ("YES" in S32), that is, when the estimated motor temperature exceeds the predetermined temperature F2 (see FIG. 18) (is a relatively high temperature), the guard value control unit 41 executes the gradual decrease process for gradually decreasing the addition angle guard value λ and the command current guard value μ (S36). The details of the gradual decrease process will be described later. After this, the guard value control unit 41 resets the counter value c to 0 (c=0) (S37). Then, the guard value control unit 41 sets the presently stored addition angle guard value λ in the addition angle guard 25A, and sets the presently stored command current guard value μ in the command current guard 31C (S42), and ends the process in the present calculation cycle.

When it is determined in S33 that the overheat protection limited current value is lower than the predetermined value J3 ("YES" in S33), that is, when the estimated motor temperature is equal to or higher than the predetermined temperature F1 (see FIG. 18) and equal to or lower than the predetermined temperature F2 (is a medium temperature), the guard value control unit 41 determines whether the condition that the absolute value of the detected steering torque T is smaller than a predetermined threshold P and the absolute value of the steering speed is smaller than a predetermined threshold Q is satisfied (S38). That is, the guard value control unit 41 determines whether the condition that the steering wheel 10 is at substantially the neutral position and a steering force is not applied to the steering wheel 10 is satisfied. The threshold P is set to, for example, 0.5 Nm. Also, the threshold Q is set to, for example, 10 deg/sec. The steering speed is calculated, for example, by executing temporal differentiation on the steering angle detected by the steering angle sensor 4. The degree of the induced voltage of the motor 3 may be used instead of the steering speed. The degree of the induced voltage of the motor 3 may be estimated based on the command voltage $V_{\gamma\delta}$* output from the PI control unit 33 and the detected current $I_{\gamma\delta}$ output from the UVW/γδ conversion unit 36.

When the condition in S38 is satisfied, that is, when the steering wheel 10 is at substantially the neutral position and a steering force is not applied to the steering wheel 10 ("YES" in S38), the guard value control unit 41 proceeds to S36 to execute the gradual decrease process. On the other hand, when it is determined in S38 that the condition is not satisfied, that is, when the steering wheel 10 is not in the neutral position or a steering force is applied to the steering wheel 10 ("NO" in S38), the guard value control unit 41 determines that the driver operates the steering wheel 10. The guard value control unit 41 does not proceed to S36, and proceeds to S34.

When it is determined in S34 that the gradual decrease executing flag Fa has been set ("YES" in S34), the gradual decrease process is being executed. Therefore, the guard value control unit 41 proceeds to S36 to execute the gradual decrease process. When it is determined in S35 that the gradual decrease completed flag Fb has been set ("YES" in S35), the guard value control unit 41 determines whether the count value c is larger than a predetermined threshold H(S39). The threshold H is set to, for example, a value that corresponds to 30 seconds. When the count value c is equal to or smaller than the threshold H ("NO" in S39), the guard value control unit 41 increments the count value c by 1 (S40). Then, the guard value control unit 41 sets the presently stored addition angle guard value λ in the addition angle guard 25A, and sets the presently stored command current guard value μ in the command current guard 31C (S42), and then ends the process in the present calculation cycle.

When it is determined in S39 that the count value c exceeds the threshold H ("YES" in S39), the guard value control unit 41 determines that the estimated motor temperature is a low value equal to or lower than predetermined temperature F1 and at least a predetermined time has elapsed after the gradual decrease process is completed, and executes the gradual increase process for gradually increasing the addition angle guard value λ, and the command current guard value μ (S41). Then, the guard value control unit 41 sets the presently stored addition angle guard value μ in the addition angle guard 25A and sets the presently stored command current guard value μ in the command current guard 31C (S42), and ends the process in the present calculation cycle.

Figure 19:
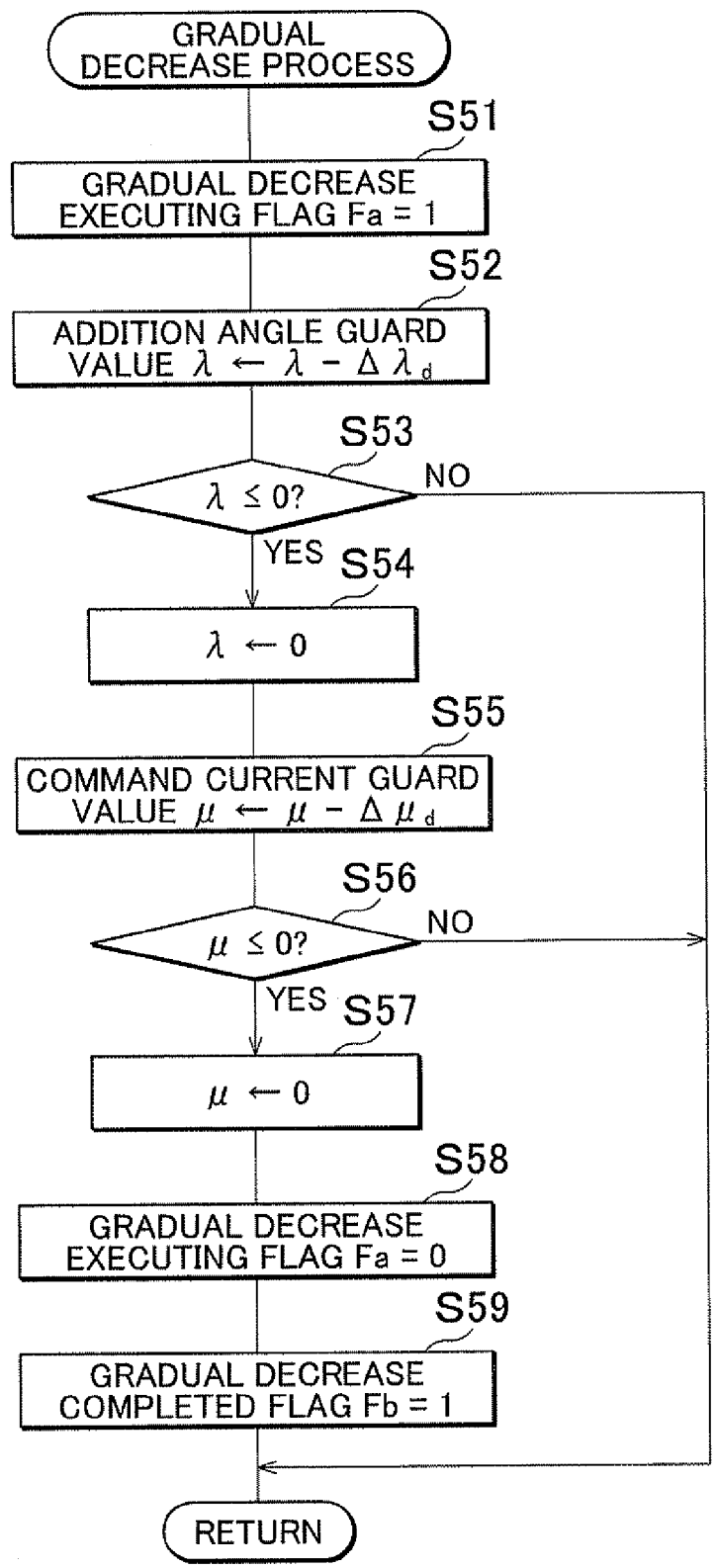
FIG. 19 is a flowchart showing the detailed steps of a gradual decrease process executed in S36 in FIG. 17.

FIG. 19 is a flowchart showing the detailed steps of the gradual decrease process executed in S36 in FIG. 17. The gradual decrease process is a process for decreasing the addition angle guard value λ to 0 and then decreasing the command current guard value μ to 0. The guard value control unit 41 first sets the gradual decrease executing flag Fa (S51). The guard value control unit 41 updates the addition angle guard value λ by subtracting the predetermined gradual decrease value $\Delta\lambda_d$ ($\Delta\lambda_d$>0) from the presently stored addition angle guard value λ (S52). Then, the guard value control unit 41 determines whether the updated addition angle guard value λ is equal to or smaller than 0 (S53). When the updated addition angle guard value λ is larger than 0 ("NO" in S53), the guard value control unit 41 proceeds to S37 in FIG. 17. In this case, the gradual decrease process is being executed and has not been completed.

When it is determined in S53 that is updated addition angle guard value λ is equal to or smaller than 0 ("YES" in S53), the guard value control unit 41 sets the addition angle guard value λ to 0 (S54). Also, the guard value control unit 41 updates the command current guard value μ by subtracting the predetermined gradual decrease value $\Delta\mu_d$ from the presently stored command current guard value μ (S55). Then, the guard value control unit 41 determines whether the updated command current guard value μ is equal to or lower than 0 (S56). When the updated command current guard value μ is higher than 0 ("NO" in S56), the guard value control unit 41 proceeds to S37 in FIG. 17. In this case, the gradual decrease process is being executed and has not been completed.

When it is determined in S56 that the updated command current guard value μ is lower than 0 ("YES" in S56), the guard value control unit 41 sets the command current guard value μ to 0 (S57). Thus, the gradual decrease process is completed. Accordingly, the guard value control unit 41 resets the gradual decrease executing flag Fa to 0 (Fa=0) (S58), and sets the gradual decrease completed flag Fb (Fb=1) (S59). Then, the guard value control unit 41 proceeds to S37 in FIG. 17.

Figure 20:
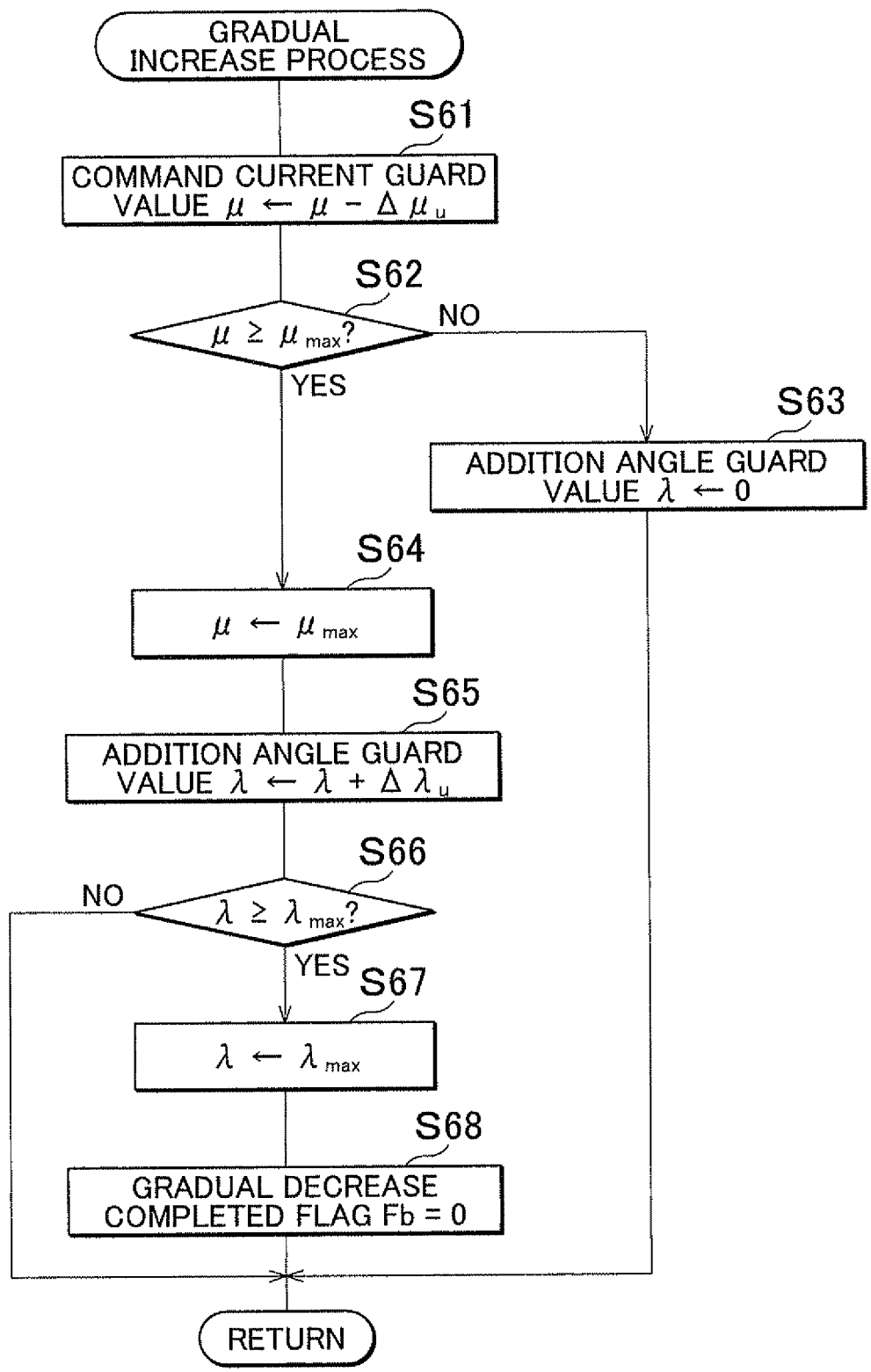
FIG. 20 is a flowchart showing the detailed steps of a gradual increase process executed in S41 in FIG. 17.

FIG. 20 is a flowchart showing the detailed steps of the gradual increase process executed in S41 in FIG. 17. The gradual increase process is a process for gradually increasing the command current guard value μ to the upper limit $\mu_{max}$ of the command current guard value μ with the addition angle guard value λ set to 0, and then gradually increasing the addition angle guard value λ to the upper limit $\lambda_{max}$ of the addition angle guard value λ. The guard value control unit 41 first updates the command current guard value μ by adding the predetermined gradual increase value $\Delta\mu_u$ ($\Delta\mu_u$>0) to the presently stored command current guard value μ (S61). Then, the guard value control unit 41 determines whether the updated command current guard value μ is equal to or higher than the upper limit $\mu_{max}$ (S62). When the update command current guard value μ is lower than the upper limit $\mu_{max}$ ("NO" in S62), the guard value control unit 41 sets the addition angle guard value λ to 0 (S63), and proceeds to S42 in FIG. 17. In this case, the gradual increase process is being executed.

When it is determined in S62 that the updated command current guard value μ is equal to or higher than the upper limit $\mu_{max}$ ("YES" in S62), the guard value control unit 41 sets the upper limit $\mu_{max}$ of the command current guard value μ as the command current guard value μ (S64). The guard value control unit 41 updates the addition angle guard value μ by adding the predetermined gradual increase value $\xi\lambda_u$ (>0) to the presently stored addition angle guard value λ (S65). Then, the guard value control unit 41 determines whether the updated addition angle guard value λ is equal to or larger than the upper limit $\lambda_{max}$ (S66).

When the updated addition angle guard value λ is smaller than the upper limit $\lambda_{max}$ ("NO" in S66), the guard value control unit 41 proceeds to S42 in FIG. 17. In this case, the gradual increase process is being executed. When it is determined in S66 that the updated addition angle guard value λ is equal to or larger than the upper limit $\lambda_{max}$ ("YES" in S66), the guard value control unit 41 sets the upper limit $\lambda_{max}$ of the addition angle guard value λ as the addition angle guard value λ (S67). Thus, the gradual increase process is completed. Accordingly, the guard value control unit 41 resets the gradual decrease completed flag Fb to 0 (Fb=0) (S68). Then, the guard value control unit 41 proceeds to S42 in FIG. 17.

Figure 21:
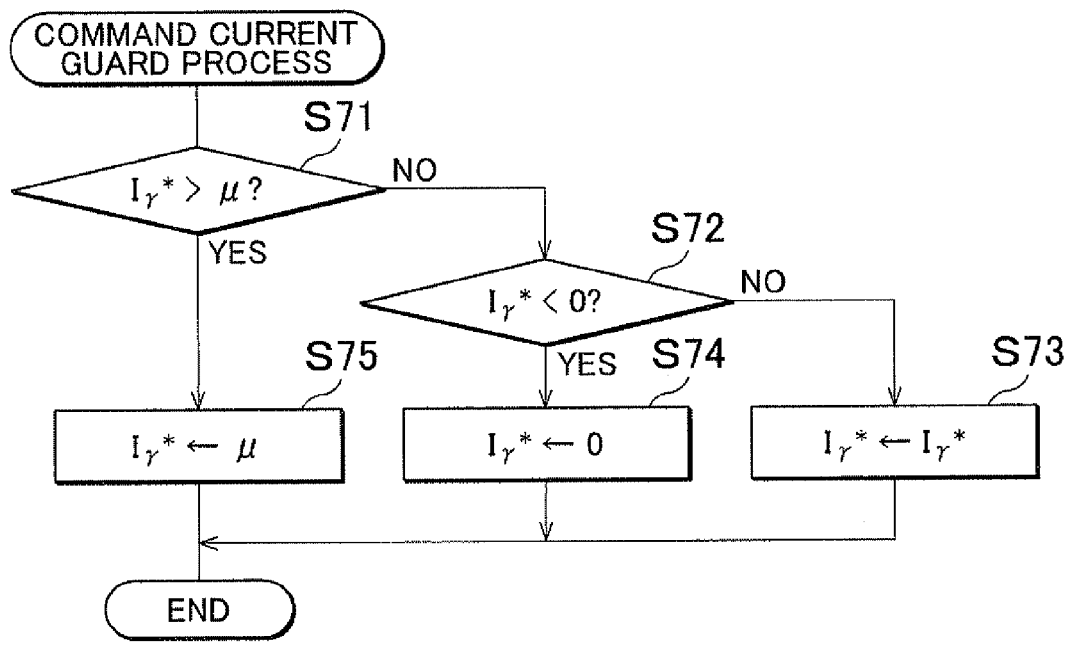
FIG. 21 is a flowchart showing the steps of a command current guard process executed by a command current guard.

FIG. 21 is a flowchart showing the steps of the command current guard process executed by the command current guard 31C. The command current guard 31C determines whether the γ-axis command current $I_\gamma^*$ provided from the command current limiter 31B is higher than the command current guard value μ set by the guard value control unit 41 (S71). When the γ-axis command current $I_\gamma^*$ is equal to or lower than the command current guard value μ ("NO" in S71), the command current guard 31C determines whether the γ-axis command current $I_\gamma^*$ is lower than 0 (S72). When the γ-axis command current $I_\gamma^*$ is equal to or higher than 0 ("NO" in S72), the command current guard 31C outputs the γ-axis command current $I_\gamma^*$ provided from the command current limiter 31B without correction (S73).

When it is determined in S72 that the γ-axis command current $I_\gamma^*$ is lower than 0 ("YES" in S72), the command current guard 31C changes the γ-axis command current $I_\gamma^*$ to 0 and outputs 0 (S74). When it is determined in S71 that the γ-axis command current $I_\gamma^*$ is higher than the command current guard value μ ("YES" in S71), the command current guard 31C changes the γ-axis command current $I_\gamma^*$ to the command current guard value μ, and outputs the command current guard value μ (S75).

Figure 22:
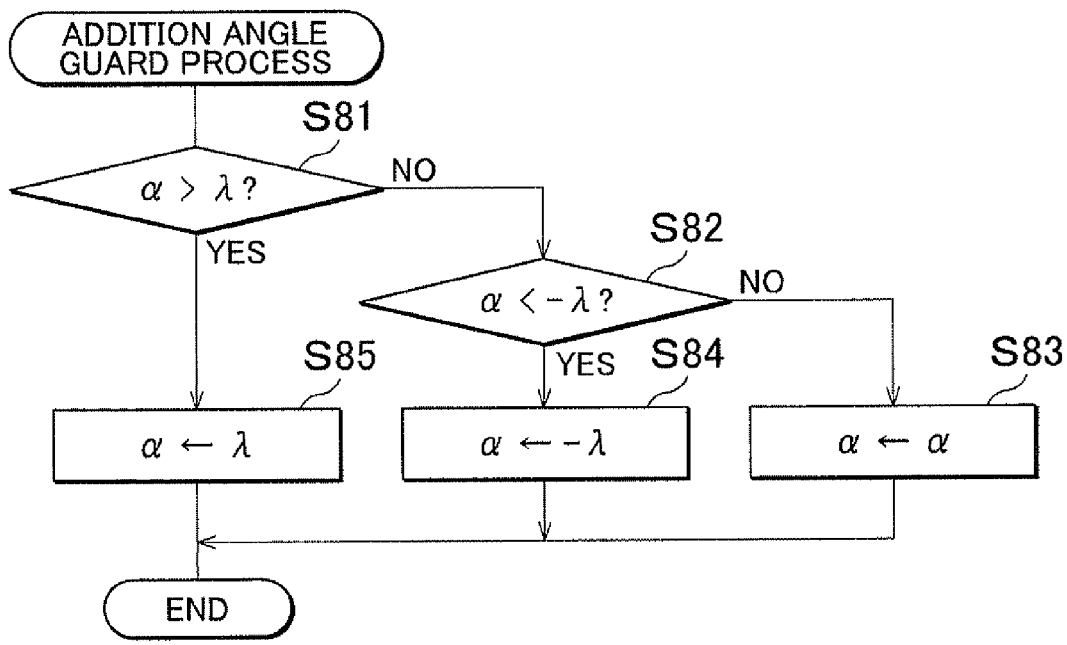
FIG. 22 is a flowchart showing the steps of an addition angle guard process executed by an addition angle guard.

FIG. 22 is a flowchart showing the steps of the addition angle guard process executed by the addition angle guard 25A. The addition angle guard 25A determines whether the addition angle α provided from the addition angle limiter 24 is larger than the addition angle guard value λ set by the guard value control unit 41 (S81). When the addition angle α is equal to or smaller than the addition angle guard value λ ("NO" in S81), the addition angle guard 25A determines whether the addition angle α is smaller than the value −λ that is obtained by multiplying the addition angle guard value λ by −1 (S82). When the addition angle α is equal to or larger than the value −λ that is obtained by multiplying the addition angle guard value λ by −1, that is, when the absolute value of the addition angle α is equal to or smaller than the addition angle guard value λ("NO" in S82), the addition angle guard 25A outputs the addition angle α provided from the addition angle limiter 24 without correction (S83).

When it is determined in S82 that the addition angle α is smaller than the value −λ that is obtained by multiplying the addition angle guard value λ by −1 ("YES" in S82), that is, when the addition angle α is a negative value and the absolute value thereof is larger than the addition angle guard value λ, the addition angle guard 25A changes the addition angle α to the value −λ that is obtained by multiplying the addition angle guard value λ by −1, and outputs the value −λ (S84). When it is determined in S81 that the addition angle α is larger than the addition angle guard value λ ("YES" in S81), that is, when the addition angle α is a positive value and the absolute value thereof is larger than the addition angle guard value λ, the addition angle guard 25A changes the addition angle α to the addition angle guard value λ and outputs the addition angle guard value λ (S85).

In the third embodiment, when the estimated motor temperature becomes higher than the predetermined temperature F2 (see FIG. 18) and the overheat protection limited current becomes lower than the predetermined value J2, the gradual decrease process is executed (S31, S32 and S36 in FIG. 17). In the gradual decrease process, the command current guard value μ is gradually decreased to 0 after the addition angle guard value λ is gradually decreased to 0. Thus, after the addition angle α is gradually decreased to 0, the γ-axis command current $I_\gamma^*$ is gradually decreased to 0. Accordingly, when the estimated motor temperature becomes higher than the predetermined temperature F2, the assist torque gradually decreases. Thus, the steering wheel 10 becomes stiffer gradually. Then, when the maxis command current $I_\gamma^*$ becomes equal to 0, the steering mode is shifted to the manual steer mode.

Therefore, it is possible to notify the driver of a sign of shift to the manual steer mode before the steering mode is shifted to the manual steer mode. Accordingly, it is possible to give an advance notice of shift to the manual steer mode. Therefore, even if a shock is generated due to shift of the steering mode to the manual steer mode, the driver is not surprised because the driver can predict generation of the shock. When the overheat protection limited current is equal to or higher than the predetermined value J2 (see FIG. 18) and lower than the predetermined value J3, that is, when the estimated motor temperature is equal to or lower than the predetermined temperature F2 and higher than the predetermined temperature F1 (is a medium temperature), if the condition that the steering wheel 10 is at substantially the neutral position and a steering force is not applied to the steering wheel 10 is satisfied, an affirmative determination is made in S38 in FIG. 17, and the gradual decrease process is executed.

When the estimated motor temperature is a medium temperature, if the driver does not operate the steering wheel 10, the command current value $I_\gamma^*$ is decreased. Thus, the electric current that is supplied to the motor 3 is decreased. Accordingly, it is possible to prevent or reduce the occurrence of the situation where the temperature of the motor 3 increases to a high temperature. If the estimated motor temperature is equal to or lower than the predetermined temperature F1 when the predetermined time defined by the predetermined value H in S39 in FIG. 17 has elapsed after the gradual decrease process is completed, or if the estimated motor temperature decreases to a value equal to or lower than the predetermined temperature F1 after the lapse of the predetermined time, the gradual increase process is executed (see S32, S33, S34, S35, S39 and S41 in FIG. 17). In this gradual increase process, after the command current guard value λ is gradually increased to the upper limit $\mu_{max}$ while the addition angle guard value λ is maintained at 0, the addition angle guard value λ is gradually increased to the upper limit $\lambda_{max}$. Thus, the command current value $I_\gamma^*$ increases to a predetermined value. Therefore, the steering mode is shifted from the manual steer mode to the power steer mode. When an affirmative determination is made in S38 or S32 because the estimated motor temperature increases during the gradual increase process, the gradual decrease process is executed.

While the embodiments of the invention have been described, the invention is not limited to the above-described embodiments and may be implemented in various other embodiments. For example, in the embodiments described above, the addition angle α is obtained by the PI control unit 23. The addition angle α may be obtained by a PID (proportional-integral-differential) calculation unit instead of the PI control unit 23. In the embodiments described above, a rotational angle sensor is not provided and the motor 3 is driven by executing the sensorless control. Alternatively, a rotational angle sensor, for example, a resolver may be provided and the above-described sensorless control may be executed when the rotational angle sensor malfunctions. Thus, even if the rotational angle sensor malfunctions, driving of the motor 3 is continued. Therefore, the steering assist operation is continued.

In this case, when the rotational angle sensor is used, the δ-axis command current value $I_\delta^*$ may be prepared by the command current value preparation unit 30 based on the steering torque and the vehicle speed and according to the predetermined assist characteristics. In the embodiments described above, the invention is applied to the electric power steering system. Alternatively, the invention may be applied to a motor control for an electric pump hydraulic power steering system. Further alternatively, the invention may be implemented in various embodiments other than a control of a motor for an electric pump hydraulic power steering system and a power steering system. For example, the invention may be applied to a steer-by-wire (SBW) system, a variable gear ratio (VGR) steering system, and a control of a brushless motor provided in another type of vehicle steering system. The motor control unit according to the invention may be used in not only a control for the vehicle steering system but also controls for motors for other use.

In addition, various design changes may be made within the scope of claims.

What is claimed is:

1. A motor control unit that controls a motor and that includes a rotor and a stator that faces the rotor, comprising:
   a current drive unit that drives the motor based on an axis current value of a rotating coordinate system that rotates in accordance with a control angle that is a rotational angle used in a control and calculated without receiving an output signal of a rotational angle sensor that detects a rotation angle of the rotor so that the control angle is determined independently from the rotation angle of the rotor;

an addition angle calculation unit that calculates, without detecting a change of the rotation angle of the rotor, an addition angle that is to be added to the control angle based on a deviation of a control torque calculated by a control torque calculation unit from a command torque set by a command torque setting unit;

a control angle calculation unit that obtains a present value of the control angle by adding the addition angle calculated by the addition angle calculation unit to an immediately preceding value of the control angle in predetermined calculation cycles;

a temperature detection/estimation unit having a temperature sensor that detects or estimates a temperature of a heat generation element; and a control angle correction unit that corrects the control angle based on the temperature detected or estimated by the temperature detection/estimation unit, wherein the control angle correction unit includes an addition angle correction unit that intermittently decreases or increases an absolute value of the addition angle that is calculated by the addition angle calculation unit when the temperature detected or estimated by the temperature detection/estimation unit is equal to or higher than a first predetermined value.

2. The motor control unit according to claim 1, wherein in a case where the temperature detected or estimated by the temperature detection/estimation unit is equal to or higher than the first predetermined value, the addition angle correction unit intermittently decreases the absolute value of the addition angle when there is a positive correlation between a load angle, which is expressed by a difference between the control angle and a rotational angle of the rotor, and a motor torque, and the addition angle correction unit intermittently increases the absolute value of the addition angle when there is a negative correlation between the load angle and the motor torque.

3. The motor control unit according to claim 2, wherein the addition angle correction unit decreases a time interval at which the absolute value of the addition angle is intermittently decreased or increased as the temperature detected or estimated by the temperature detection/estimation unit increases.

4. The motor control unit according to claim 2, wherein:

the addition angle correction unit decreases the absolute value of the addition angle as the temperature detected or estimated by the temperature detection/estimation unit increases when there is the positive correlation between the load angle and the motor torque; and the addition angle correction unit increases the absolute value of the addition angle as the temperature detected or estimated by the temperature detection/estimation unit increases when there is the negative correlation between the load angle and the motor torque.

5. The motor control unit according to claim 1, wherein when the temperature detected or estimated by the temperature detection/estimation unit is equal to or higher than a second predetermined value that is higher than the first predetermined value, the addition angle correction unit notifies the current drive unit of a current stop command.

6. The motor control unit according to claim 1, wherein the control angle correction unit includes:

an addition angle limit unit that limits an absolute value of the addition angle that is calculated by the addition angle calculation unit based on an addition angle guard value; and a guard value control unit that gradually decreases the addition angle guard value when the temperature detected or estimated by the temperature detection/estimation unit is higher than a predetermined value in a case where there is a positive correlation between a load angle, which is expressed by a difference between the control angle and a rotational angle of the rotor, and a motor torque.

7. The motor control unit according to claim 6, wherein the guard value control unit gradually decreases a command current guard value to 0 after gradually decreasing the addition angle guard value to 0.

8. The motor control unit according to claim 1, further comprising:

a torque detection unit that detects a torque other than a motor torque, which is applied to a drive target that is driven by the motor, wherein the control angle correction unit includes a command torque setting unit that sets a command torque that is a torque that is other than the motor torque and that is to be applied to the drive target, the addition angle calculation unit calculates the addition angle based on a deviation of a detected torque that is detected by the torque detection unit from the command torque that is set by the command torque setting unit, and the command torque setting unit increases an absolute value of the command torque as the temperature detected or estimated by the temperature detection/estimation unit increases.

9. The motor control unit according to claim 8, wherein when the temperature detected or estimated by the temperature detection/estimation unit is higher than a predetermined value, the command torque setting unit increases the absolute value of the command torque as the temperature detected or estimated by the temperature detection/estimation unit increases.

10. The motor control unit according to claim 1, wherein the heat generation element is the motor or a drive circuit that supplies electric power to the motor.

11. A vehicle steering system, comprising:

a motor that supplies a driving force to a steering mechanism of a vehicle; and the motor control unit according to claim 1.

12. A motor control unit that controls a motor and that includes a rotor and a stator that faces the rotor, comprising:

a current drive unit that drives the motor based on an axis current value of a rotating coordinate system that rotates in accordance with a control angle that is a rotational angle used in a control and calculated without receiving an output signal of a rotational angle sensor that detects a rotation angle of the rotor so that the control angle is determined independently from the rotation angle of the rotor;

an addition angle calculation unit that calculates, without detecting a change of the rotation angle of the rotor, an addition angle that is to be added to the control angle based on a deviation of a control torque calculated by a control torque calculation unit from a command torque set by a command torque setting unit;

a control angle calculation unit that obtains a present value of the control angle by adding the addition angle calculated by the addition angle calculation unit to an immediately preceding value of the control angle in predetermined calculation cycles;

a temperature detection/estimation unit having a temperature sensor that detects or estimates a temperature of a heat generation element; and a control angle correction unit that corrects the control angle based on the temperature detected or estimated by the temperature detection/estimation unit, wherein the control angle correction unit includes an addition angle correction unit that intermittently decreases or increases an absolute value of the addition angle that is calculated by the addition angle calculation unit when the temperature detected or estimated by the temperature detection/estimation unit is equal to or higher than a first predetermined value, wherein in a case where the temperature detected or estimated by the temperature detection/estimation unit is equal to or higher than the first predetermined value, the addition angle correction unit intermittently decreases the absolute value of the addition angle when there is a positive correlation between a load angle, which is expressed by a difference between the control angle and a rotational angle of the rotor, and a motor torque, and the addition angle correction unit intermittently increases the absolute value of the addition angle when there is a negative correlation between the load angle and the motor torque, and wherein the addition angle correction unit decreases a time interval at which the absolute value of the addition angle is intermittently decreased or increased as the temperature detected or estimated by the temperature detection/estimation unit increases.

13. A motor control unit that controls a motor and that includes a rotor and a stator that faces the rotor, comprising:

a current drive unit that drives the motor based on an axis current value of a rotating coordinate system that rotates in accordance with a control angle that is a rotational angle used in a control and calculated without receiving an output signal of a rotational angle sensor that detects a rotation angle of the rotor so that the control angle is determined independently from the rotation angle of the rotor;

an addition angle calculation unit that calculates, without detecting a change of the rotation angle of the rotor, an addition angle that is to be added to the control angle based on a deviation of a control torque calculated by a control torque calculation unit from a command torque set by a command torque setting unit;

a control angle calculation unit that obtains a present value of the control angle by adding the addition angle calculated by the addition angle calculation unit to an immediately preceding value of the control angle in predetermined calculation cycles;

a temperature detection/estimation unit having a temperature sensor that detects or estimates a temperature of a heat generation element; and a control angle correction unit that corrects the control angle based on the temperature detected or estimated by the temperature detection/estimation unit, the control angle correction unit including:

an addition angle limit unit that limits an absolute value of the addition angle that is calculated by the addition angle calculation unit based on an addition angle guard value; and a guard value control unit that gradually decreases the addition angle guard value when the temperature detected or estimated by the temperature detection/estimation unit is higher than a predetermined value in a case where there is a positive correlation between a load angle, which is expressed by a difference between the control angle and a rotational angle of the rotor, and a motor torque, wherein the motor control unit controls the motor without receiving an output of a rotational angle sensor that detects a rotation angle of the rotor.

14. The motor control unit according to claim 13, wherein the guard value control unit gradually decreases a command current guard value to 0 after gradually decreasing the addition angle guard value to 0.

* * * * *